US008180861B2

(12) United States Patent
Hodgson et al.

(10) Patent No.: US 8,180,861 B2
(45) Date of Patent: May 15, 2012

(54) SYSTEM AND METHOD FOR PROVIDING A COMMUNICATIONS CLIENT ON A HOST DEVICE

(75) Inventors: John Stuart Hodgson, Ottawa (CA); Matthew Bells, Waterloo (CA); Thomas Leonard Trevor Plestid, Ottawa (CA); Edward Snow Willis, II, Ottawa (CA); Sean Elliott Wilson, Branchton (CA); David Paul Yach, Waterloo (CA)

(73) Assignee: Research In Motion Limited, Waterloo, ON ( * ) Notice: Subject to any disclaimer, the term of this patent is extended or adjusted under 35 U.S.C. 154(b) by 1212 days.

(21) Appl. No.: 11/102,671

(22) Filed: Apr. 11, 2005

(65) Prior Publication Data
US 2006/0026281 A1  Feb. 2, 2006

Related U.S. Application Data

(60) Provisional application No. 60/592,131, filed on Jul. 30, 2004.

(51) Int. Cl.
*G06F 15/177* (2006.01)
*G06F 3/00* (2006.01)
(52) U.S. Cl. ........ 709/220; 719/312; 719/313; 719/319; 719/328
(58) Field of Classification Search .......... 709/203–205, 709/225, 220; 455/557, 556.1; 719/312, 719/313, 319, 328–330; 718/1
See application file for complete search history.

(56) References Cited

U.S. PATENT DOCUMENTS

| 5,546,595 | A | 8/1996 | Norman et al. |
| 5,968,133 | A | 10/1999 | Latham |
| 6,043,815 | A | 3/2000 | Simonoff et al. |
| 6,054,983 | A | 4/2000 | Simonoff et al. |
| 6,055,205 | A | 4/2000 | Rao et al. |
| 6,078,321 | A | 6/2000 | Simonoff et al. |

(Continued)

FOREIGN PATENT DOCUMENTS

GB  2333866  8/1999

(Continued)

OTHER PUBLICATIONS

Ahmad et al., SIM-based WLAN access for open platforms, Aug. 2003, Technology@Intel magazine.*

(Continued)

*Primary Examiner* — Joseph Avellino
*Assistant Examiner* — James Conaway
(74) *Attorney, Agent, or Firm* — Moffat & Co.

(57) ABSTRACT

A system and a method (100, 500) for integrating an uncertified client (104) with a certified host device (102) are provided. The integration system (100) is configured to integrate the uncertified client (104), which has a plurality of client applications (106), with the certified host device (102), and has a client virtual machine (108), host applications (142), and an abstraction layer (138, 156). The client virtual machine (108) is coupled to the uncertified client (104) and is configured to execute the plurality of client applications (106). The host applications (142) are coupled to the certified host device (102) and are configured to control host dependent features on the certified host device (102). The abstraction layer (138, 156) are coupled to the host applications (142) and to the client virtual machine (108), and are configured to translate feature calls from the plurality of client applications (106) to function calls for the host applications (142).

9 Claims, 16 Drawing Sheets

U.S. PATENT DOCUMENTS

| | | | | |
|---|---|---|---|---|
| 6,078,322 | A | 6/2000 | Simonoff et al. | |
| 6,091,412 | A | 7/2000 | Simonoff et al. | |
| 6,549,917 | B1 | 4/2003 | Pollard | |
| 6,675,371 | B1* | 1/2004 | York et al. | 717/114 |
| 7,024,548 | B1 | 4/2006 | O'Toole, Jr. | |
| 7,207,036 | B2* | 4/2007 | Charnell | 717/140 |
| 7,210,121 | B2* | 4/2007 | Xia et al. | 717/106 |
| 7,266,564 | B2 | 9/2007 | Kihara et al. | |
| 7,318,110 | B2 | 1/2008 | Yumoto et al. | |
| 7,363,384 | B2 | 4/2008 | Chatani et al. | |
| 7,437,432 | B2 | 10/2008 | Bodin et al. | |
| 7,823,168 | B1* | 10/2010 | Pike et al. | 719/328 |
| 2002/0099863 | A1* | 7/2002 | Comeau et al. | 709/310 |
| 2002/0099902 | A1* | 7/2002 | Comeau | 711/100 |
| 2002/0161957 | A1* | 10/2002 | Comeau et al. | 710/260 |
| 2003/0108039 | A1 | 6/2003 | Shell et al. | |
| 2003/0191799 | A1 | 10/2003 | Araujo et al. | |
| 2004/0088417 | A1 | 5/2004 | Bober et al. | |
| 2004/0098731 | A1 | 5/2004 | Demsey et al. | |
| 2004/0111315 | A1 | 6/2004 | Sharma et al. | |
| 2004/0117466 | A1 | 6/2004 | Bodin et al. | |
| 2004/0117494 | A1 | 6/2004 | Mitchell et al. | |
| 2004/0127190 | A1* | 7/2004 | Hansson et al. | 455/403 |
| 2004/0158624 | A1 | 8/2004 | Bodin et al. | |
| 2004/0192274 | A1* | 9/2004 | Vuori | 455/418 |
| 2004/0242209 | A1 | 12/2004 | Kruis et al. | |
| 2004/0261114 | A1 | 12/2004 | Addington et al. | |
| 2005/0001162 | A1 | 1/2005 | Schneider | |
| 2005/0044164 | A1 | 2/2005 | O'Farrell et al. | |
| 2005/0071845 | A1* | 3/2005 | Kallio et al. | 719/310 |
| 2005/0075115 | A1 | 4/2005 | Corneille et al. | |
| 2005/0108369 | A1 | 5/2005 | Sather et al. | |
| 2005/0149951 | A1* | 7/2005 | Uola et al. | 719/328 |
| 2005/0153693 | A1 | 7/2005 | Kaappa | |
| 2006/0041645 | A1* | 2/2006 | Zhang et al. | 709/220 |
| 2009/0113088 | A1* | 4/2009 | Illowsky et al. | 710/62 |
| 2010/0257524 | A1* | 10/2010 | Weissman et al. | 718/1 |

FOREIGN PATENT DOCUMENTS

| | | | |
|---|---|---|---|
| WO | W/O 99/553621 | * | 10/1999 |
| WO | 2004063924 | | 7/2004 |

OTHER PUBLICATIONS

Sun, About the Java Technology, Dec. 2002.*
7layers, Services for the information and communications industry, Apr. 1, 2004 http://web.archive.org/web/20040329101035/http://www.7layers.com/.*
International Search Report dated Jun. 22, 2005.
Sun Microsystems: "Excerpt from "Mobile Information Device Profile, Version 2.0, JSR 118", pp. 1-48, 115-127, 330-344, 431-500" [Online] Nov. 2, 2002, XP002497530 Retrieved from the Internet: URL:http://java.sun.com/products/midp/>.
European Search Report, EP 05734064 dated Nov. 10, 2008.
IPER search report, PCT/CA2005/001164 dated Feb. 8, 2007.
Sun Microsystems: "Excerpt from "Mobile Information Device Profiles, Version 2.0, JSR 118", pp. 1-48, 115-127, 330-344, 431-500" [Online] Nov. 2, 2002, XP002497530 URL:http://java.sun.com/products/midp/>[retrieved on Sep. 25, 2008].
Official Action, U.S. Appl. No. 11/188,756 dated Dec. 18, 2008.
EP 05768218, Examination Report dated Dec. 8, 2008.
International Search Report, Jun. 22, 2005.
EP 05734064, Examination Report dated Jul. 9, 2009.
Canadian patent application No. 2,575,581, CIPO, Examiner's report dated Feb. 18, 2010.

* cited by examiner

300

| HOST PLATFORM HEADER | 204 |

| JUL 26, 2004 | 10:03P | ◁ | M | T | W | T | F | S | S | ▷ |

9:00A
10:00A
11:00A
12:00P
1:00P
2:00P
3:00P
4:00P
5:00P

114

| HOST PLATFORM HEADER | 206 |

*FIG. 3*

AZERTY PAGE 1

AZERTY PAGE 2

QWERTZ PAGE 1

QWERTZ PAGE 2

SYSTEM AND METHOD FOR PROVIDING A COMMUNICATIONS CLIENT ON A HOST DEVICE

RELATED APPLICATIONS

The present application claims priority from U.S. provisional application Ser. No. 60/592,131 filed Jul. 30, 2004.

FIELD OF THE APPLICATION

The present application relates to an integration of a client into a host device, and more specifically to architecture for integrating a client without requiring the client to certify its signalling and for supporting communication between host and client applications.

BACKGROUND OF THE APPLICATION

It is desirable to add a client, such as a data communications client, onto a host wireless device to perform functions that the host wireless device would not normally include. However, the host wireless device could be, and typically is, already certified with its software and hardware to communicate over a wireless network without the client, especially in the case of the client being integrated after-market onto the host wireless device. It is desirable for the client to be able to communicate with native applications on the host wireless device and for the host applications to be able to communicate with client applications. Such a communication preferably includes a user interface control on the host wireless device from a client application, including registering inputs to the host wireless device for the client application and displaying or outputting from the client application. In some cases it is also desirable to be able to use host settings, such as locale information, time zones, display themes and backgrounds, from a host environment in a client setting. An automatic propagation of a change in a host device setting may also be preferable in some situations. It may also be desirable to have symbol inputs to the client correspond with symbol inputs to the host wireless device, to simplify the input of symbols, and to be able to upgrade or downgrade the provisioning of the client directly from the host wireless device without having to load new software on the host wireless device.

BRIEF DESCRIPTION OF THE DRAWINGS

The present system and method will be better understood with reference to the drawings in which:

FIG. 3 is an exemplary screen capture representing the calendar application of the client applications started from a host environment in accordance with at least one of the preferred embodiments;

DETAILED DESCRIPTION OF THE PREFERRED EMBODIMENTS

Figure 1:
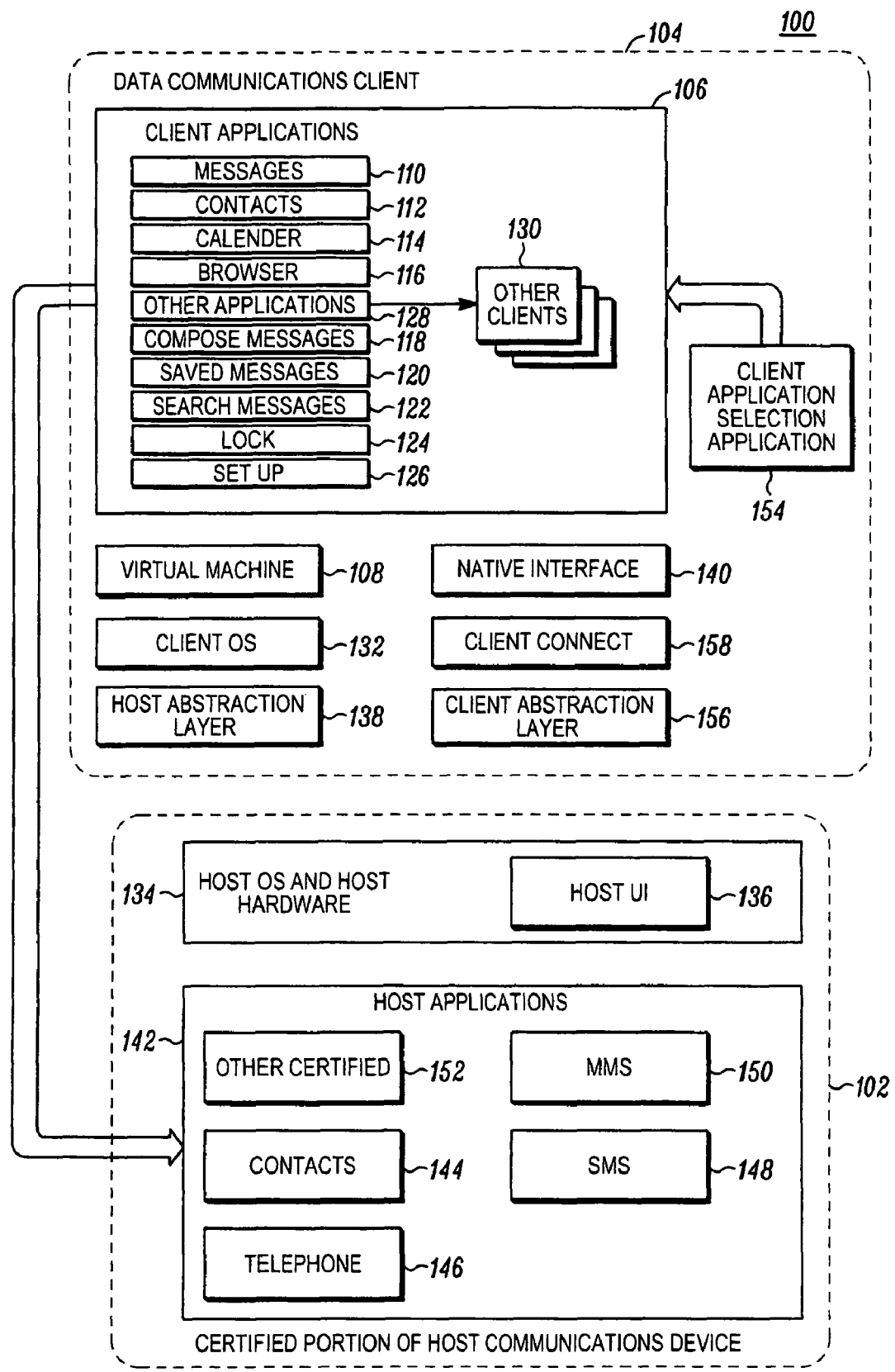
FIG. 1 is an exemplary schematic diagram of a method and system for a divided architecture for integrating a certified host communications device and uncertified client in accordance with at least one of the preferred embodiments.

The present application provides a divided architecture for integrating a client into a host wireless device. In the present system the host is recognized as the dominant determinant in a divided architecture because device type certification efforts, such as Global Certification Forum ("GCF") and Personal Communication Services ("PCS") Type Certification Review Board ("PTCRB"), may occur prior to the client being integrated onto the host wireless device, which necessitates the host wireless device and tightly-tied applications to the host wireless device to remain unfettered.

The present application provides a virtual machine that is started upon start-up of the host wireless device and is used to run client applications. The virtual machine communicates through a client operating system ("OS") that would normally send client application commands and functions to host dependent features, such as hardware, software, firmware and communications networks. However, because the host dependent features are certified and controlled by the host wireless device, the client OS instead communicates with abstraction layers. The abstraction layers have a native interface for communicating with host applications, allowing client applications to use the host dependent features by utilizing host applications.

Device settings, such as locale, time zone, display themes and backgrounds, can be set using a binary variable. In one mode, the client settings are adapted to automatically adjust when host device settings are changed. This change is propagated by either having a listener at the host wireless device to signal a change in host device settings, or polling when a graphical interface of the client is brought to the foreground. In the other mode, the client settings can be fixed at the client and changes at the host wireless device are ignored.

The client application accesses the user interface of the host wireless device using a host native application, a platform abstraction layer and a host independent engine communicating between the user interface and a client application. The host independent engine is platform independent and relies on the platform abstraction layer to translate and/or map function calls. The host native application depends on the user interface and host device, and is used to control actions and updates to the user interface. For example, in a system for entering symbols to the client where the host wireless device has a native system for entering symbols from a host symbol table by navigating a host cursor to move between adjacent symbols displayed within a host grid and the host further has a keyboard, the keyboard can be utilized to map symbols to one keystroke. A client symbol table is created conforming to the host symbol table, and a grid is made where the indicia of at least one keyboard key is associated with a symbol such that when a user actuates a key in the keyboard, the cursor jumps to the corresponding symbol. Provisioning of the device can also be accomplished from software that is already loaded onto the host wireless device. By following steps from the client application on the host wireless device, provisioning of the client can be changed. A host wireless device user is thereby enabled to upgrade or downgrade client service, i.e. to provision the data client.

FIG. 1 is an exemplary schematic diagram of a method and system for a divided architecture 100 for integrating a certified host communications device 102 and uncertified client, a data communications client 104 in accordance with at least one of the preferred embodiments. The divided architecture 100 includes client applications 106 running on top of a virtual machine 108. The client applications 106 can be any application that is designed to run on the virtual machine 108 in the data communications client 104, and may include a messages application 110 for viewing messages that have been received, a contacts application 112 to present an address book including phone numbers, e-mail addresses or other contact information for individuals or companies, calendar application 114 for scheduling appointments and managing time, a browser application 116 for browsing the internet or other network, a compose-message application 118 to compose messages for Short Message Service ("SMS") or e-mail, a saved-messages application 120 to view messages that have been saved, a search-messages application 122 to search for a particular message, a lock application 124 to lock the keyboard and screen of the host device, and a set-up application 126 to change the set-up configuration for the data communications client 104. Other applications 128 could also exist as part of client applications 106 and the above-listed applications are not meant to be limiting. Further, other clients besides the data communications client 104 could exist on the certified host communications device 102 and these other clients 130 could have applications which could be invoked from the other applications 128. The virtual machine 108 is preferably started at power-up of the certified host communications device 102 and continues to run as long as the certified host communication device 102 is in operation. The virtual machine 108 may be a Java virtual machine and client applications 106 may be Java applications. All client applications 106 use the virtual machine 108 to invoke instances of objects created by the client applications 106.

A feature call on the divided architecture 100 from the client applications 106 would normally go through a client OS 132. The client OS 132 may include a number of primitives for interacting with host OS and host hardware 134, which includes a host user interface 136. However, in the case that the client applications 106 are built onto the certified host communications device 102 and because the certified host communications device 102 has already acquired certification for its host dependent features such as hardware, software and firmware, it is preferable to have the client OS 132 interact with a host abstraction layer 138 instead of having the client OS 132 directly interacting with the features. The host abstraction layer 138 converts calls from the client applications 106 to host calls through a native interface 140. The native interface 140 invokes host applications 142 in order to use the host dependent features on the certified host communications device 102. The host applications 142 may include a variety of applications such as, but not limited to, a host contacts application 144 including an address book having phone numbers, e-mail addresses or other contact information for individuals or companies, a telephone-related application 146, an SMS application 148, a multi-media message service ("MMS") application 150, and other certified applications 152. These individual host applications are started within the host application 142, and a request from the client application 106 is sent through the client OS 132 to the host abstraction layer 138 where the request is converted with the native interface 140 for the host applications 142.

Because the host applications 142 invoke the features of the certified host communications device 102 rather than the client applications 106 directly utilizing the features, the divided architecture 100 enables the client applications 106 to run in a host environment and use the features of the certified host communications device 102 without having to re-certify. The divided architecture 100 therefore enables the uncertified client, which is the data communications client 104, to be added to the certified host communications device 102 after certification, including an after-market addition to the certified host communications device 102.

One example of a client application using the above described method and system includes the making of a telephone call when the certified host communications device 102 is a cellular telephone. In the host environment, making of the telephone call simply involves using the host applications 142 to create the telephone call where the host applications 142 use certified hardware, firmware and software to connect through a wireless system. However, in the client applications 106, the above described divided architecture 100 requires invoking one of the host applications 142 in order to make the telephone call. The invoked client application could be the address book associated with the contacts application 112, which includes phone numbers for individuals. A user may wish to select a telephone number of a particular individual from the address book associated with the contacts application 112, and to have the cellular telephone, which is the certified host communications device 102 in this example, to make a call to that particular individual. In order to accomplish this task, the user may select the telephone number and select an option to dial that phone number. In this case, the contacts application 112 indicates through the virtual machine 108 to the client OS 132 that it needs to make a telephone call. Instead of using the host dependent feature directly from the client OS 132, a notification is sent to the host abstraction layer 138, which invokes an appropriate application of the host applications 142 through the native interface 140, to make the telephone call. In this example, the invoked host application would be the telephone-related application 146, which starts the telephone call, and the user proceeds as if the telephone call had been started from the client applications 106.

The client applications 106 may also provide the user an option to use the SMS application 148 or the MMS application 150 to contact the individual instead of dialling the telephone number. In each of these cases, a different application of the host applications 142 is invoked, but this task is accomplished similarly through the host abstraction layer 138 and the native interface 140. Alternatively, the messages application 110, which includes a telephone number, may be invoked from the client applications 106.

As one skilled in the art will realize, data is supplied between the client applications 106 and the host applications 142. In the example above, the telephone number would be supplied to the host application 142 including the telephone-related application 146, the SMS application 148, and the MMS application 150.

It is further desirable to be able to activate a selected client application of the client applications 106 from one of the host applications 142. A client application selection application 154 uses a client abstraction layer 156 to activate an application within the client applications 106. The client application selection application 154 calls a function that is translated in the client abstraction layer 156. The client abstraction layer 156 then uses the virtual machine 108 to activate the selected client application of the client applications 106. The client abstraction layer 156 may either inject the client OS 132 event into the virtual machine 108 causing the selected client application of the client applications 106 to become active or, alternatively, may perform a "reverse native call" through the client OS 132 or via a client connect 158 to manipulate the native representation of some client object causing the selected client application of the client application 106 to become active. The client connect 158 can be used for network features for the client applications 106, which enables, for example, the data communications client 104 to communicate using a specific protocol that was not originally supported on the certified host communications device 102. The client connect 158 involves a protocol stack to perform this communication between the data communications client 104 and the certified host communications device 102, and increases and improves client functionality.

Figure 2:
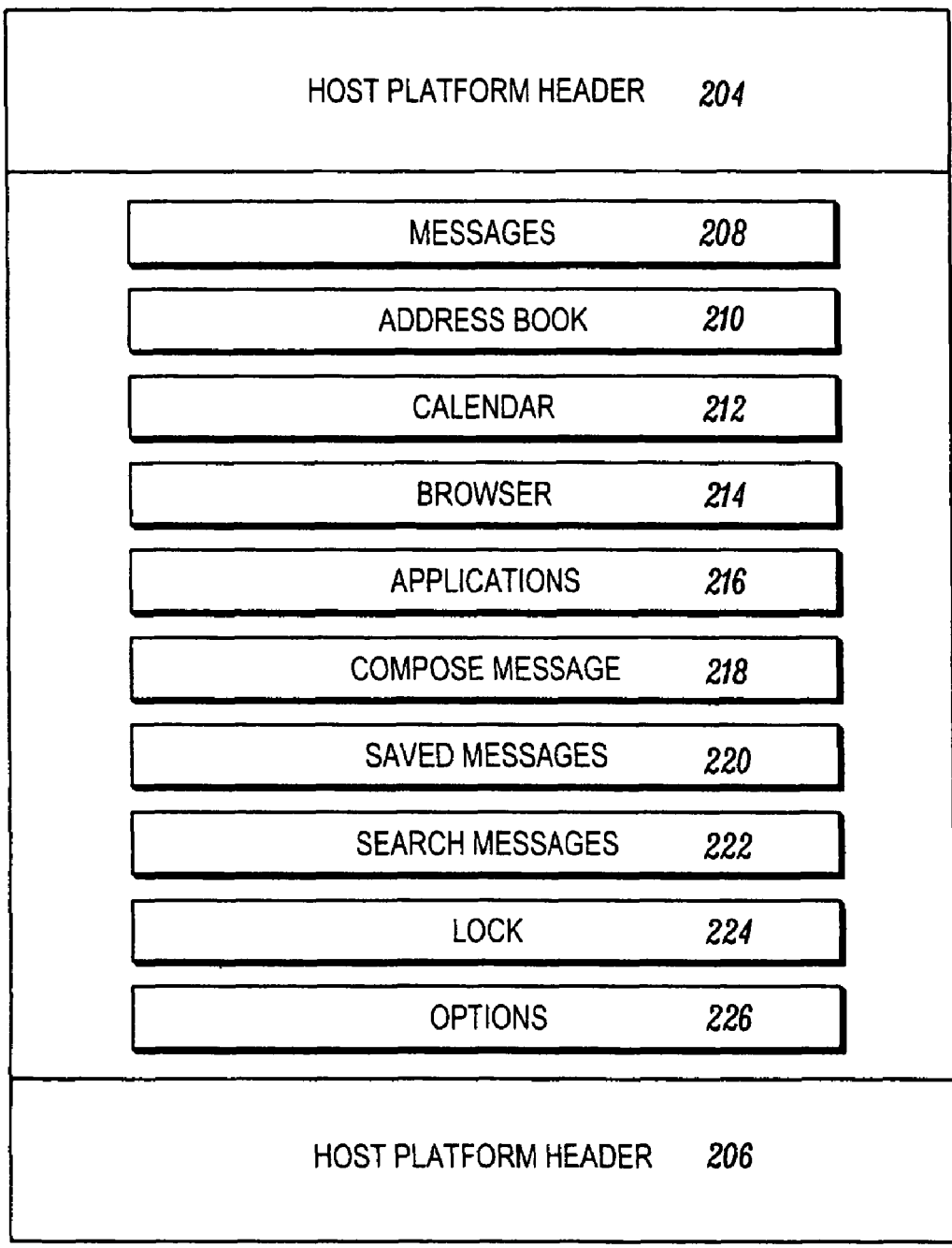
FIG. 2 is an exemplary screen capture of a host application showing various applications that can be selected in the host environment in accordance with at least one of the preferred embodiments.

FIG. 2 is an exemplary screen capture 200 of a host application 202 showing various applications that can be selected in the host environment. The host application 202 lists a series of client applications that can be activated, and may include a header section 204 and a footer section 206, each displaying various information such as a program name or status information. As used herein, "activated" can mean to both start a particular client application of the client applications 106 or to bring an already started client application of the client applications 106 to the foreground. In FIG. 2, the host application 202 displays the following titles associated with the client applications 106: Messages 206 associated with the messages application 110, Address Book 208 associated with the contacts application 112, Calendar 210 associated with the calendar application 114, Browser 212 associated with the browser application 116, Applications 214 associated with other applications 128, Compose Messages 216 associated with the compose-message application 118, Saved Message 218 associated with the save-messages application 120, Search Messages 220 associated with the search-messages application 122, Lock 224 associated with Lock 124, and Options 224 associated with the set-up applications 128. In order to activate a particular client application of the client applications 106, the user scrolls to the client application that he desires and selects the client application. When a particular client application of the client applications 106 is selected in the host environment, the client application selection application 154 uses a set of application programming interfaces ("APIs") by which the host OS and host hardware 134 can request the selected client application of the client applications 106 to be activated.

A request for the selected client application to be activated is converted into function calls through the native interface 140, which, in turn, makes calls on the client applications 106. The selected client application is then brought into the foreground of a display of the certified host communications device 102. Alternatively, the client application selection application 154 may communicate directly with the virtual machine 108 to activate the selected client application of the client applications 106. This direct communication may occur, for example, in the case where the client application selection application 154 knows the code or a hook to start the selected client application. Once the virtual machine 108 receives the request to activate the selected client application, either directly from the client application selection application 154 or through the client abstraction layer 156, the selected client application is activated and is required to assume control of the host user interface 136. To accomplish this task, the selected client application makes a call back to the client application selection application 154 indicating that the selected client application requires the host user interface 136. The client application selection application 154 then uses host code to take over the host user interface 136, and thus becomes a portal between the selected client application of the client applications 106 and the certified host communications device 102. The client application selection application 154 adapts all of the host inputs to events for the data communications client 104 and takes over control of the host user interface 136. If the certified host communications device 102 requires control of the host user interface 136 back, the data communications client 104 is notified through the client application selection application 154 of this requirement.

Figure 4:
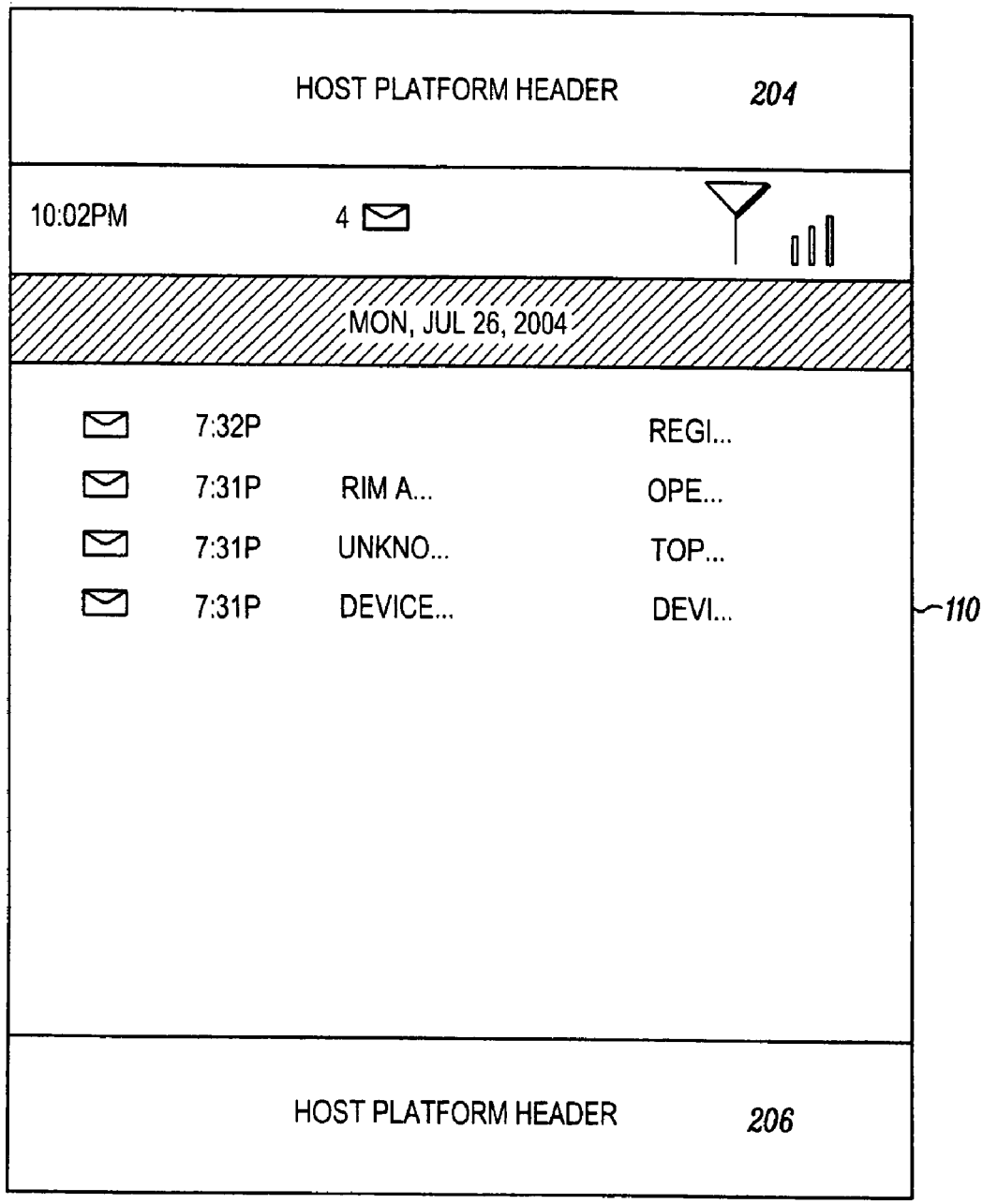
FIG. 4 is an exemplary screen capture representing the messages application of the client applications started from the host environment in accordance with at least one of the preferred embodiments.

FIG. 3 is an exemplary screen capture 300 representing the calendar application 114 of the client applications 106 started from a host environment, and FIG. 4 is an exemplary screen capture 400 representing the messages application 110 of the client applications 106 started from the host environment. As will be appreciated by one skilled in the art, a screen bar or other marker on the screen capture could be used to indicate that the client is in the host environment.

It is further desirable, when using the certified host communications device 102 and the data communications client 104, to be able to synchronize device settings in certain situations. The device settings may include locale settings, time zone settings or theme settings. The locale settings may include various settings such as the language of the interface, for example, English or French or Spanish, and may also include the keyboard configuration, e.g., QWERTY, AZERTY, QWERTZ or DVORAK. The theme settings may include color patterns and background images.

In the setup application 126 shown in FIG. 1, the user can choose between a mode that allows the user to use host settings for the device settings or custom settings. As one skilled in the art will appreciate, a different mode setting could be used for theme, locale and time zone, or these could be all included in one mode setting. If the mode is set to the host settings, the device settings for the data communications client 104 are synchronized with the device settings of the certified host communications device 102. Any changes in the device settings of the certified host communications device 102 are propagated to the data communications client 104 and the device settings of the data communications client 104 are, therefore, also changed. For example, if the user changes the language from French to English in the host applications 142, this change is propagated to the data communications client 104, and the client applications 106 would use English. If the client display is set to mimic the host display, then propagation of changes in the host display is accomplished by having a listener application monitor the host device settings. Upon a change in the host device settings, the host listener notifies the setup application 126 that a change has been made to the host device settings and this change will be reflected in the client device settings.

Alternatively, propagation of a change in the device settings may include polling every time a graphical user interface from the client takes over. This polling involves comparing the host device settings with the client device settings and determining if a change has been made. If a change has been made, the client device settings are updated. Thus if the mode is 'automatic' or 'host settings', changes in the certified host communications device 102 settings are pushed to the data communications client 104, either through the host listener or by polling, as described above. Conversely, if the mode is set to 'manual' or 'client settings', the user can update the device settings in the data communications client 104 and the client applications 106 will use these device setting instead of the host device settings. If the mode is set to 'client settings', then changes to the device settings of the certified host communications device 102 will be ignored by the client applications 106.

Figure 5:
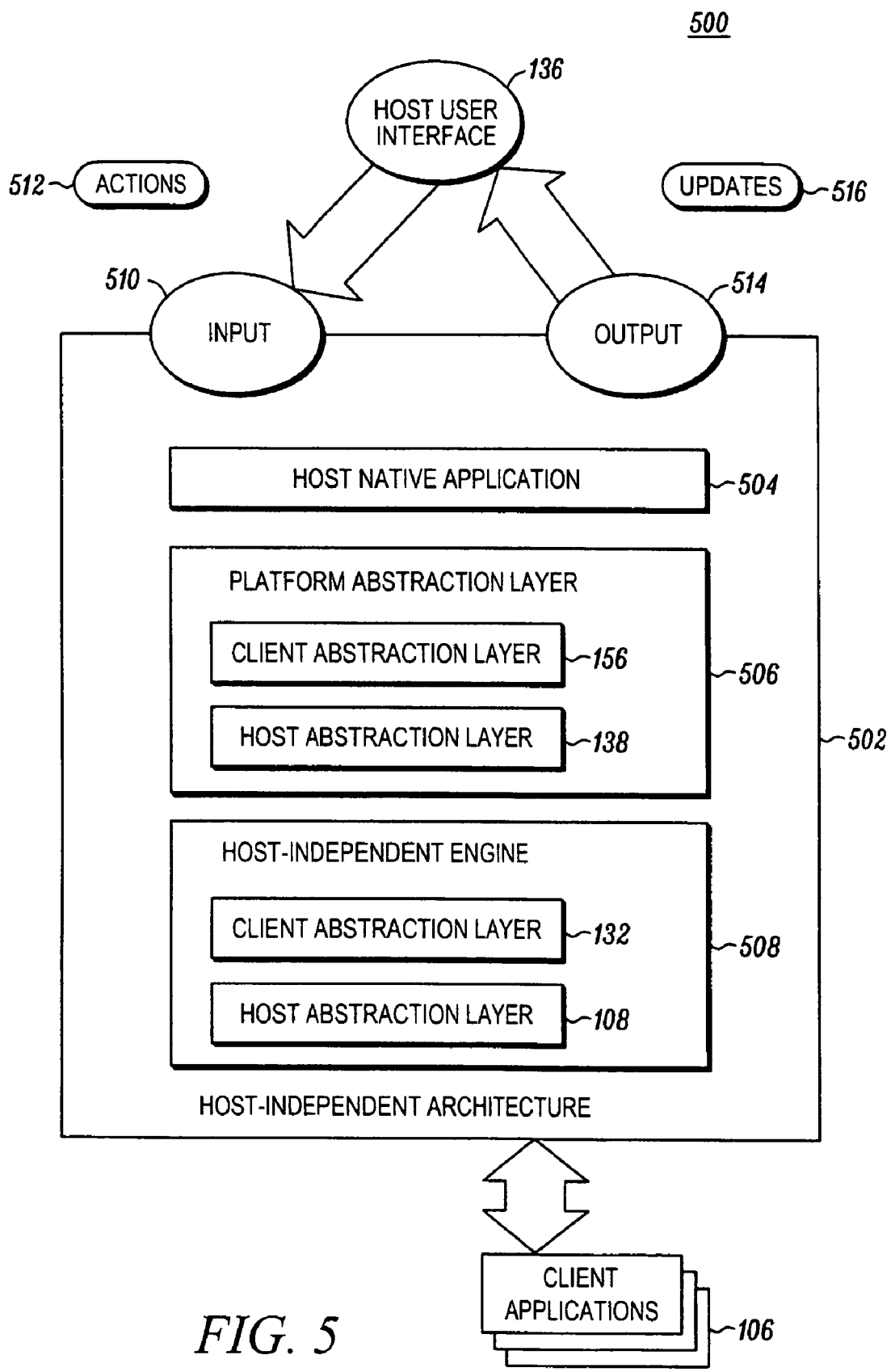
FIG. 5 is an exemplary schematic diagram of components and dataflow for a client user interface in accordance with at least one of the preferred embodiments.

FIG. 5 is an exemplary schematic diagram 500 of components and dataflow for the host user interface 136 in accordance with at least one of the preferred embodiments. In order to interact with a user of a host device, the client applications 106 need to access the host user interface 136. On the certified host communications device 102, which may be equipped one or more input devices such as a keypad, keyboard, roller wheel, scrollstrip, touch-pad, d-pad or other navigation device, and a screen, the user must be able to input actions for the client applications 106, and the results of the input and operations of the client applications 106 need to be communicated back to the user, for example by displaying the resulting actions on the screen. In order to accomplish this task, three components are provided within the client input/output ("I/O") architecture 502 of the divided architecture 100: they are a host-native application 504; a platform abstraction layer 506; and a host-independent engine 508.

Because the platform abstraction layer 506 contains the host abstraction layer 138 and the client abstraction layer 156, translation between the data communications client 104 and the certified host communications device 102 is performed within the platform abstraction layer 506, which may be a C function interface.

The host-independent engine 508 is a platform independent component, and includes both the virtual machine 108 and the client OS 132. The virtual machine 108 and the client OS 132 are used to activate, start, or call instances of objects in the client applications 106 when the data communications client 104 is object oriented, and to call functions in the data communications client 104 when the data communications client 104 is not object oriented.

The host native application 504 resides beyond the platform abstraction layer 506, and thus is able to adapt the host user interface 136 to conform and adapt to the certified host communications device 102 on behalf of the client applications 106. The client application selection application 154 previously described is an uncertified embodiment of the host native application 504. As will be appreciated by one skilled in the art, other embodiments could be certified. The host native application 504 can take radically different forms depending upon the design of the host application infrastructure and the user interface requirements of the host operating system. The host native application 504 is responsible for creating the framework necessary to receive input and update output when the user brings a particular client application of the client applications 106 to the foreground. In a keyboard/display embodiment, this process may involve creating windows, buttons or graphics widgets of any kind. In a voice-only host embodiment, this process may involve speech recognition and voice synthesis. The host native application 504 is also responsible for passing a user input 510 to the host independent engine 508 through the platform abstraction layer 506. The user input 510 is received by the host user interface 136, and may include user actions 512 such as button presses, keystrokes, stylus inputs, roller wheel motions, scrollstrip motions, touch-pad motions, d-pad motions, voice commands, accelerometer motions or other inputs that would be known to those skilled in the art. The user input 510 is translated and/or mapped as received from the host OS 132 and fed through the input function of the platform abstraction layer 506.

For an output 514 to the host user interface 136, the host native application 504 may receive screen updates 516 from the host independent engine 508 at any time, including when none of the client applications 106 is in the foreground. These updates 516 must be stored and memory is used by the host native application 504 to maintain a complete frame buffer copy separate from the application display area. If the host native application 504 is in the foreground when receiving an update from the host independent engine 508, then the application display area must be updated as well as the frame buffer so that the display on the host device reflects the screen change immediately. Whenever the host native application 504 transitions into the foreground, it must update the application display area with the complete contents of the frame buffer. Other types of the output 514 to the host user interface 136 may include audio tones, voice, and signals to actuate host-specific features, such as an offset motor or LED for discrete notification or indication.

In accordance with at least one of the preferred embodiments, the host native application 504 uses a framework that updates the user by simply displaying a graphic image provided by the platform abstraction layer 506, and processes the user actions 512 by adapting them to be sent down as events to the platform abstraction layer 506. This process greatly reduces the complexity of host native application 504, thus enhancing the portability of the data communications client 104 to other host devices.

FIGS. 6 to 14 illustrate examples of how the host native application 504 adapts user actions 512 and provides the host user interface 136 on behalf of the client applications 106 adapted to the semantics of a particular host.

Figure 6:
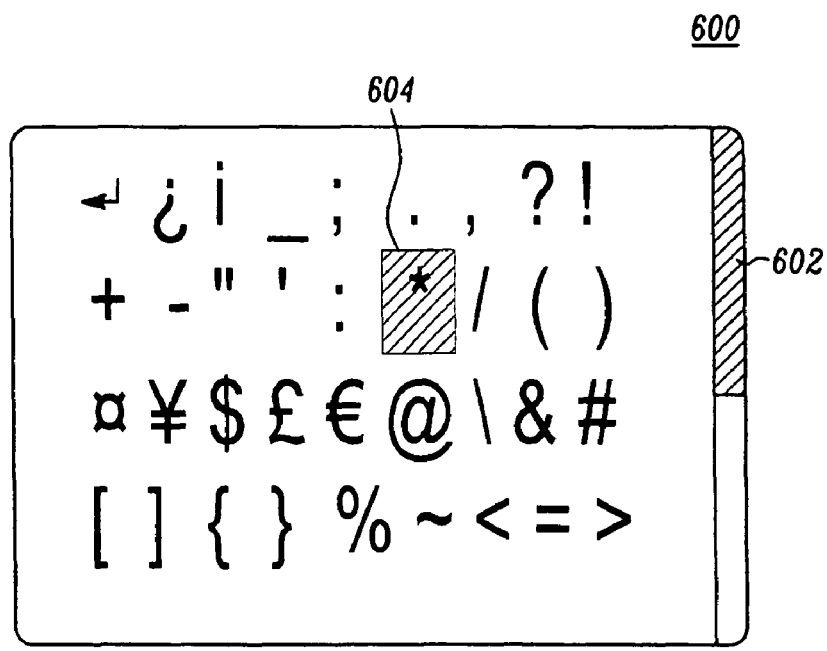
FIG. 6 is an exemplary screen view of a system for symbolic input on a host device having a 9×6 symbol table.

FIG. 6 is an exemplary screen view 600 of a system for symbolic input on a host device having a 9×6 symbol table.

Figure 7:
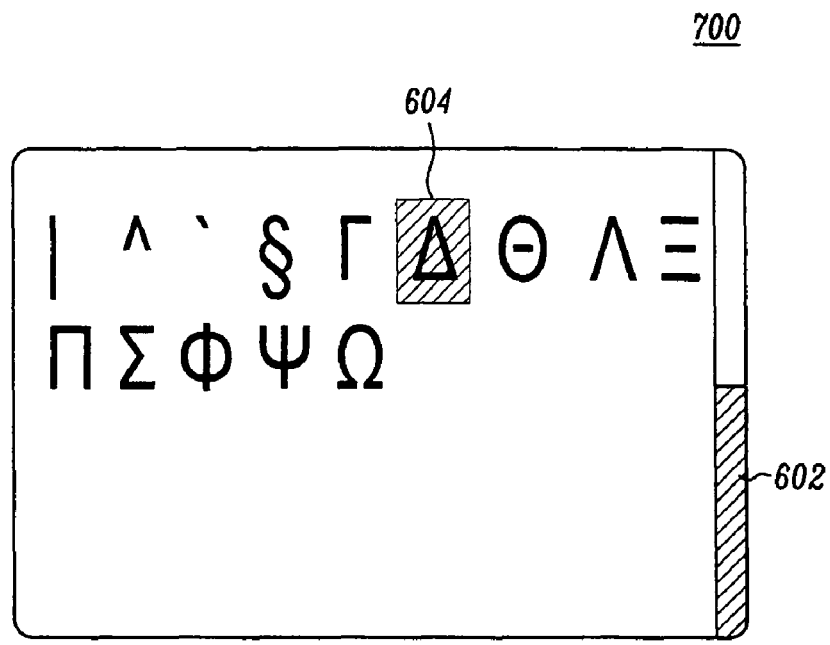
FIG. 7 is an exemplary screen view of the second page of the system for symbolic input of FIG. 6.

The system employs a particular semantic for symbolic input that the users of traditional application on the host will expect to be valid on all applications utilized on the host. Operationally, a host graphical user interface element 602 provides a 9×6 symbol table to a user. A cursor 604 is moved along a 9×4 grid in order to select a desired symbol. Because the number of rows of the grid is generally smaller than that of the table, the symbols are offered on two pages. FIG. 7 is an exemplary screen view 700 of the second page of the 9×6 symbol table for symbolic input of FIG. 6.

Figure 8:
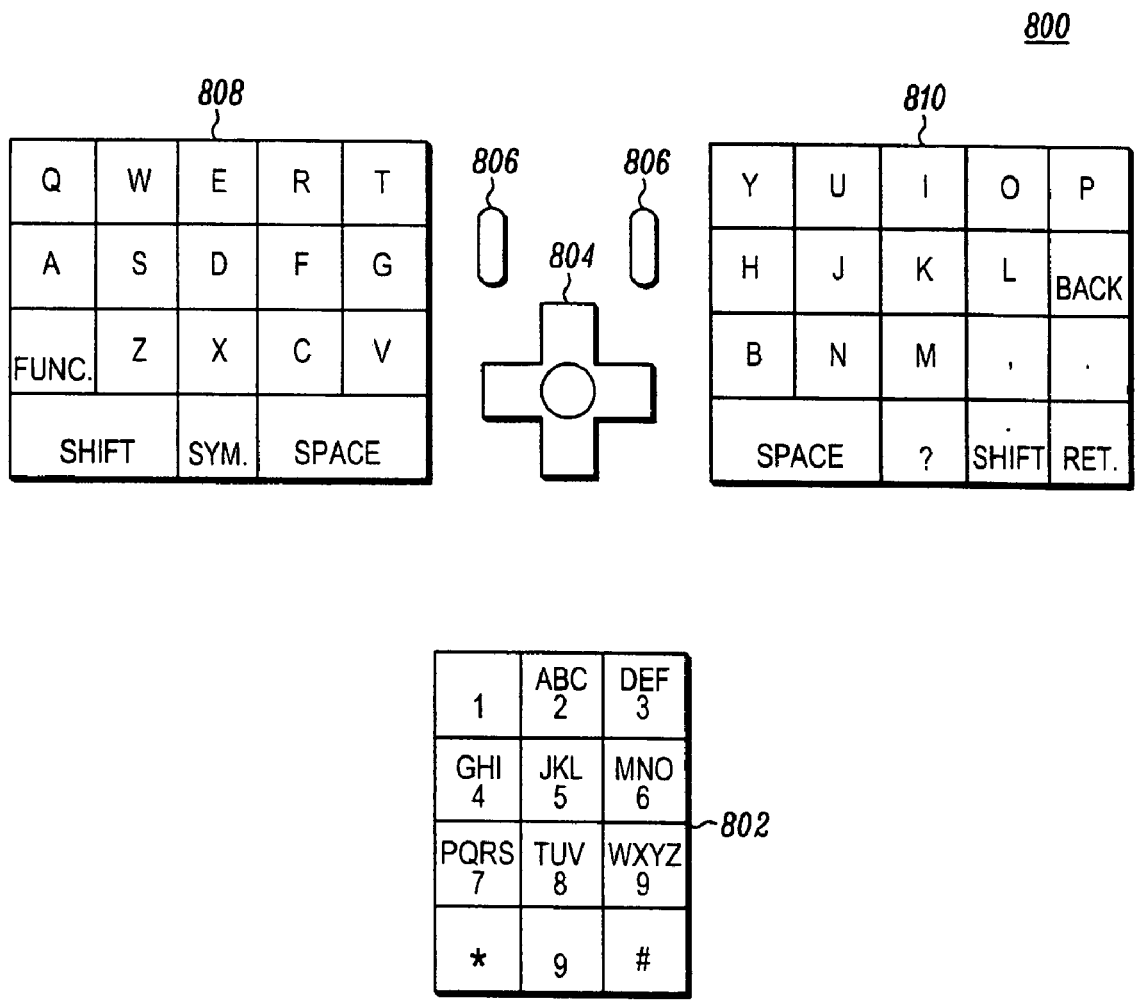
FIG. 8 is an exemplary block diagram of user input devices that may be available on a host device.

FIG. 8 is an exemplary block diagram 800 of user input devices that may be available on a host device. The user may manipulate any number of input devices on the host device, including a keypad 802, a 4-directional D-pad 804, rocker switches 806, as well as a QWERTY keyboard provided in two portions, a left keyboard portion 808 and a right keyboard portion 810. Most notably, the host semantics for symbolic input on this particular host require that cursor 604 be moved on the grid by manipulating D-pad 804 to select a particular symbol. In this particular example, the host native application 504 preserves the semantics of symbolic input on the host device while adapting actions of a particular client application which the user is likely to desire for symbolic input because of the data-centric features of the client applications 106.

Figure 9:
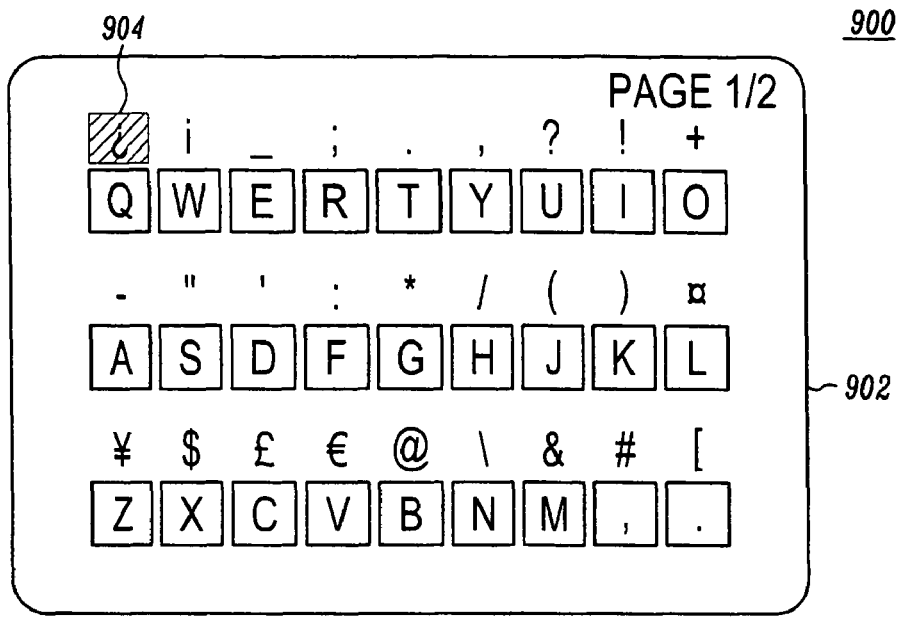
FIG. 9 is an exemplary screen view of page one of a variation of the 9×6 symbol table having QWERTY keyboard layout with symbols mapped to certain letters on two pages.
Figure 10:
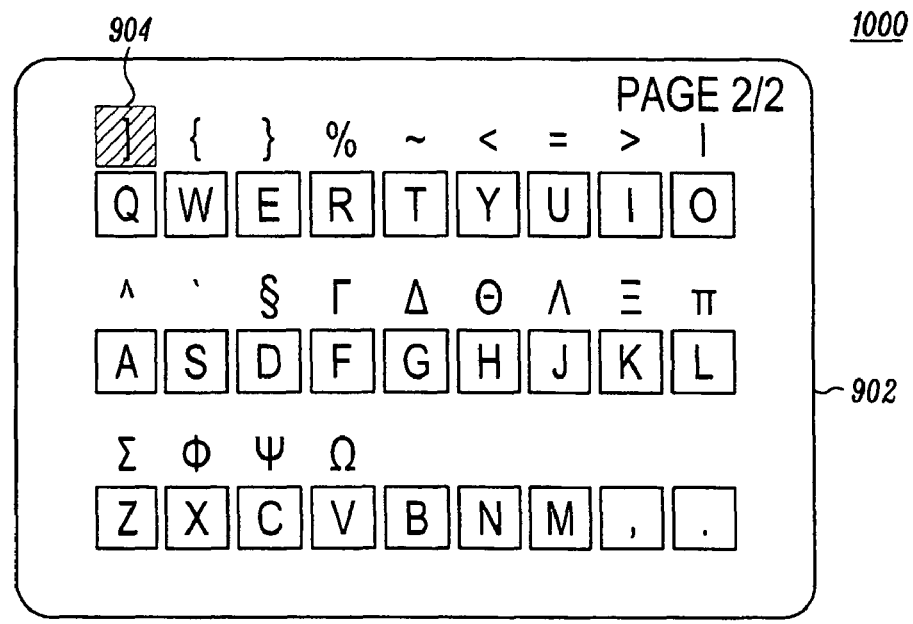
FIG. 10 is an exemplary screen view of page two of the 9×6 symbol table of FIG. 9.

FIG. 9 is an exemplary screen view 900 illustrating page one of a variation of a 9×6 symbol table having QWERTY keyboard layout with symbols mapped to certain letters on two pages. A client graphical user interface element 902 provides a slightly different 9×6 symbol table on two pages, wherein symbols can still be selected by operation of the D-pad 804 illustrated in FIG. 8, thus preserving the host symbolic input semantics. A cursor 904 is now moved on a 9×3 grid instead of a 9×6 grid. This grid height is preferable enabling mapping of one row of each of the letter rows of the keyboard 808 and 810 of FIG. 8 to one of the symbol rows of the grid. The width of the grid is maintained the same as in the host graphical user element 602 to allow a traditional host application user to quickly learn the layout of the symbol table while utilizing the client applications 106, and to continue to contemporaneously support the use of the D-pad 804 for selecting a symbol. Thus, the user is enabled to directly input one of 27 symbols using one keystroke instead of having to resort to using the D-pad 804, while still accepting input using the D-pad 804. FIG. 10 is an exemplary screen view 1000 illustrating page two of the 9×6 symbol table of FIG. 9 with the cursor 904 placed over one of the symbols shown on the client graphical user interface element 902.

Figure 11:
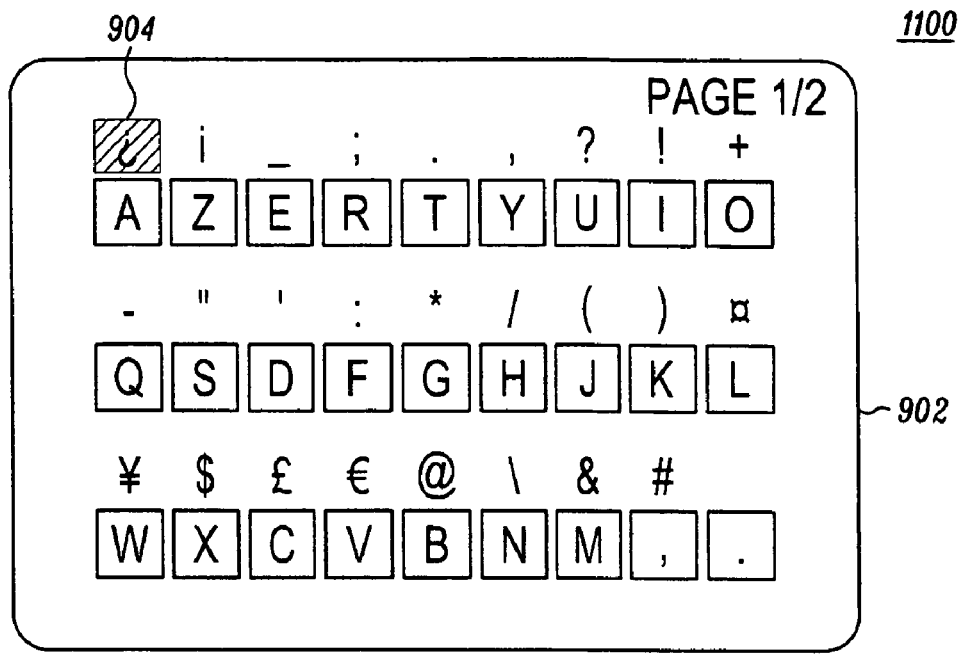
FIG. 11 is an exemplary screen view of page one of adaptation and conformity to a host variant having an AZERTY keyboard mapped to certain letters on two pages.
Figure 12:
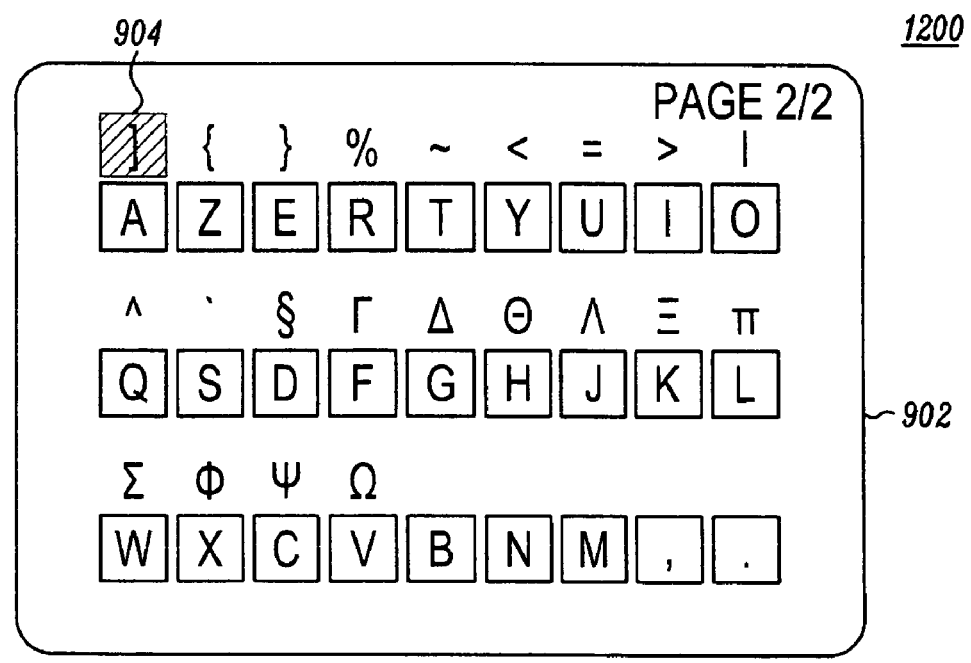
FIG. 12 is an exemplary screen view of page two of the 9×6 symbol table of FIG. 11.
Figure 13:
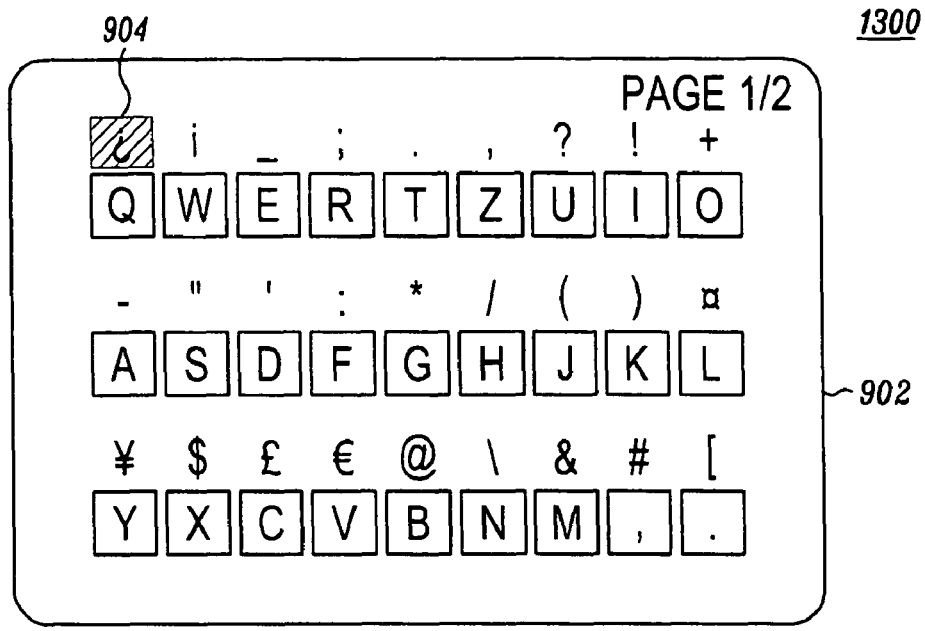
FIG. 13 is an exemplary screen view of page one of adaptation and conformity to a host variant having a QWERTZ keyboard mapped to certain letters on two pages.
Figure 14:
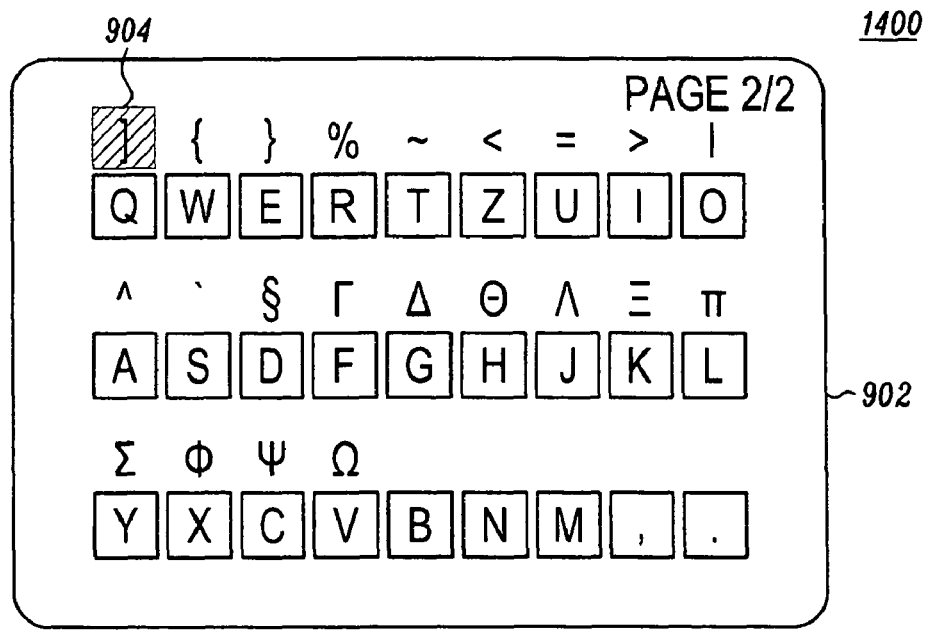
FIG. 14 is an exemplary screen view of page two of the 9×6 symbol table of FIG. 13.

FIGS. 11 to 14 illustrate how the host native application can further adapt and conform to the semantics of variants of a host device. FIG. 11 is an exemplary screen view 1100 illustrating page one of adaptation and conformity to a host variant having an AZERTY keyboard mapped to certain letters on two pages shown on the client graphical user interface element 902 with the cursor 904 placed over one of the symbols. FIG. 12 is an exemplary screen view 1200 illustrating page two of the 9×6 symbol table of FIG. 11 with the cursor 904 placed over one of the symbols shown on the client graphical user interface element 902. FIG. 13 is an exemplary screen view 1300 illustrating page one of adaptation and conformity to a host variant having a QWERTZ keyboard mapped to certain letters on two pages shown on the client graphical user interface element 902 with the cursor 904 placed over one of the symbols. FIG. 14 is an exemplary screen view 1400 illustrating page two of the 9×6 symbol table of FIG. 13 with the cursor 904 placed over one of the symbols shown on the host graphical user interface element 902.

Note that in each case of FIGS. 9 to 14, the indicia used in the client graphical user interface element 902 conforms to the layout of the particular host keyboard such as the keyboard 808 an 810 illustrated in FIG. 8, and that the input actions taken by the user are adapted to select the corresponding symbol. In sum, the host native application 504 adapts keystrokes by mapping each grid location on the 9×3 grid onto a key on the client graphical user interface element 902, shown as QWERTY, AZERTY and QWERTZ variants in FIGS. 9 to 14, and for output, the host native application 504 enhances the display by showing the indicia of a corresponding alphabetic key directly below each symbol. Note that the examples of FIGS. 9 to 14 deliberately do not use the rightmost key of the top row of a standard keyboard. In the examples of FIGS. 9 an 10, the key marked by the 'P' indicia in right keyboard portion 810 is not used because the top-most rows of the three standard keyboards shown herein contains 10 keys. This intentional omission has been shown above to provide advantages and thus should not be considered a limitation. Nonetheless, it is envisaged that the techniques taught herein could be adapted to other keyboard layouts and grid sizes on a per host basis by those of skill in the art, and thus those adaptations are also within the scope of this application. Alternatively, the unused keys can remain unutilized or can be assigned a function to further enhance symbolic input, such as toggling between the various symbol pages. It is also envisaged that toggling between symbol pages can be accomplished by use of any one of the many other keys available on the particular keyboard available on the host keyboard.

Figure 15:
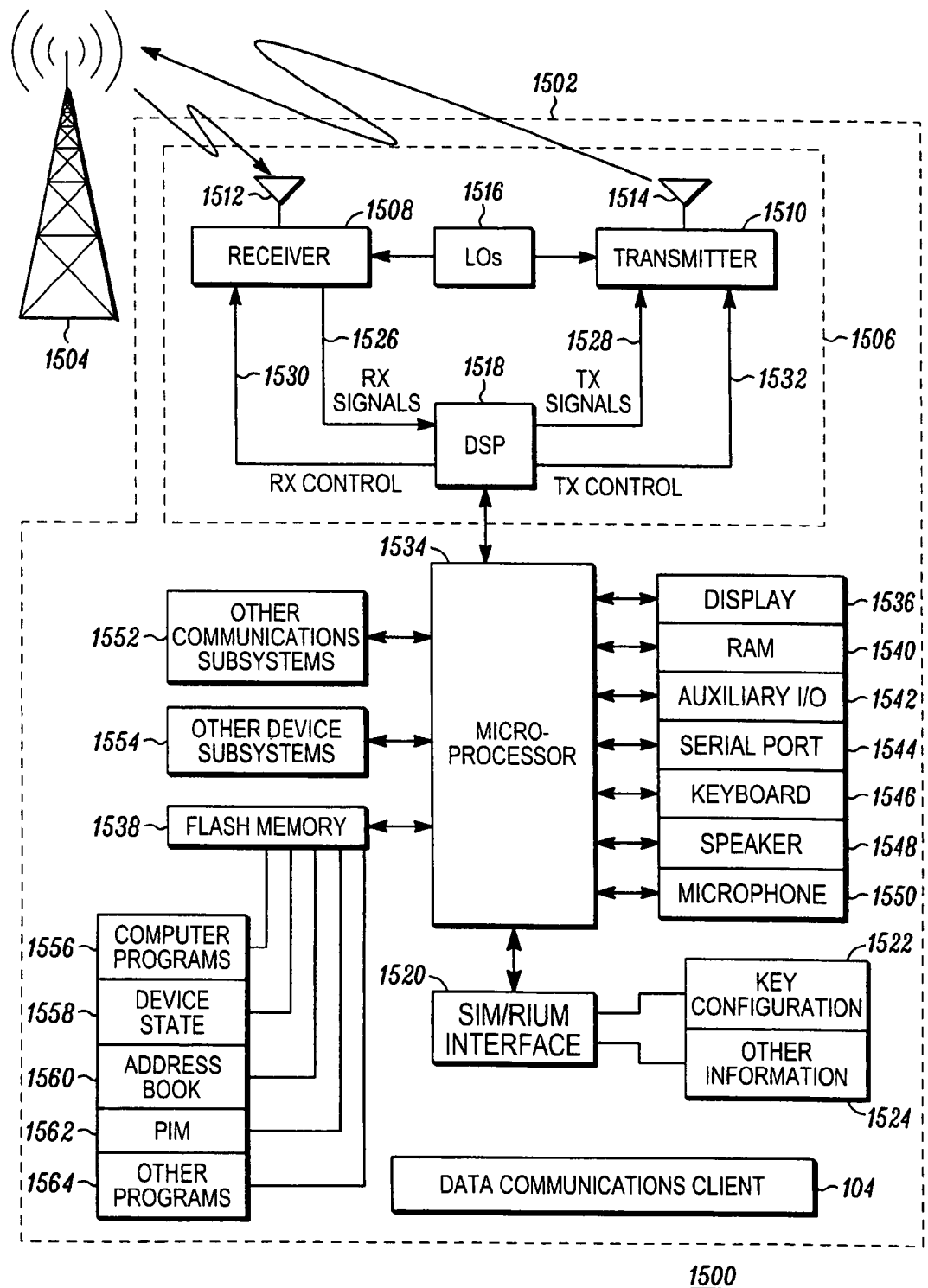
FIG. 15 is a block diagram of a host mobile station in wireless communication with a communication network in accordance with at least one of the preferred embodiments.

FIG. 15 is a block diagram 1500 of a host mobile station 1502 in wireless communication with a communication network 1504 in accordance with at least one of the preferred embodiments. The host mobile station 1502 is preferably a two-way wireless communication device having at least voice and data communication capabilities, and preferably also has the capability to communicate with other computer systems on the Internet. Depending on the exact functionality provided, the host mobile station 1502 may be referred to as a data messaging device, a two-way pager, a wireless e-mail device, a cellular telephone with data messaging capabilities, a wireless Internet appliance, or a data communication device, as examples.

Where the host mobile station 1502 is enabled for two-way communication, it will incorporate a communication subsystem 1506, including both a receiver 1508 and a transmitter 1510, as well as associated components such as one or more, preferably embedded or internal, a receiver antenna 1512 and a transmitter antenna 1514, local oscillators ("LO"s) 1516, and a processing module such as a digital signal processor ("DSP") 1518. As will be apparent to those skilled in the field of communications, the particular design of the communication subsystem 1506 will be dependent upon the communication network in which the device is intended to operate. For example, host mobile station 1502 may include the communication subsystem 1506 designed to operate within the Mobitex™ mobile communication system, the DataTAC™ mobile communication system, General Packet Radio Service ("GPRS") network, Universal Mobile Telecommunications System ("UMTS") network, Enhanced Data for Global System for Mobile Communications ("GSM") Evolution ("EDGE") network or Code Division Multiple Access ("CDMA") network.

Network access requirements will also vary depending upon the type of network 1504. For example, in the Mobitex and DataTAC networks, the host mobile station 1502 is registered on the communication network 1504 using a unique identification number associated with each mobile station. In UMTS and GPRS networks, and in some CDMA networks, however, network access is associated with a subscriber or user of the host mobile station 1502. A GPRS mobile station therefore requires a subscriber identity module ("SIM") card in order to operate on a GPRS network, and a Removable User Identity Module ("RUIM") in order to operate on some CDMA networks. Although the host mobile station 1502 would not fully function without a valid SIM/RUIM card if it is a GPRS/UMTS/CDMA mobile station, local or non-network communication functions, as well as legally required functions (if any) such as "911" emergency calling, may still be available. However, the host mobile station 1502 will be unable to carry out any other functions involving communications over the communication network 1504. A SIM/RUIM interface 1520, which is configured to accept a SIM/RUIM card, is normally similar to a card-slot into which the SIM/RUIM card can be inserted and ejected like a diskette or a Personal Computer Memory Card International Association ("PCMCIA") card. The SIM/RUIM card can have approximately 64K of memory and hold many key configuration 1522, and other information 1524 such as identification, and subscriber related information.

When required network registration or activation procedures have been completed, the host mobile station 1502 may send and receive communication signals over the communication network 1504. Signals received by the receiver antenna 1512 from the communication network 1504 are input to the receiver 1508, which may perform such common receiver functions as signal amplification, frequency down conversion, filtering, channel selection and the like, and in the example system shown in FIG. 15, analog to digital ("A/D") conversion. A/D conversion of a received signal allows more complex communication functions such as demodulation and decoding to be performed in the DSP 1518. In a similar manner, signals to be transmitted are processed, including modulation and encoding for example, by the DSP 1518 and input to the transmitter 1510 for digital to analog ("D/A") conversion, frequency up conversion, filtering, amplification and transmission over the communication network 1504 via the transmit antenna 1514. The DSP 1518, in addition to processing receive and transmit communication signals 1526 and 1528, provides for receiver and transmitter controls 1530 and 1532. For example, the gains applied to communication signals in the receiver 1508 and the transmitter 1510 may be adaptively controlled through automatic gain control algorithms implemented in the DSP 1518.

The communication network 1504 may further communicate with multiple systems (not shown). For example, the communication network 1504 may communicate with both an enterprise system and a web client system in order to accommodate various clients with various service levels.

The host mobile station 1502 preferably includes a microprocessor 1534, which controls the overall operation of the host mobile station 1502. Communication functions, including at least data and voice communications, are performed through the communication subsystem 1506. The microprocessor 1534 also interacts with further device subsystems such as flash memory 1536, a display 1538, random access memory ("RAM") 1540, auxiliary input/output (I/O) subsystems 1542, a serial port 1544, a keyboard 1546, a speaker 1548, a microphone 1550, other communications subsystem 1552, and any other compatible device subsystems, which is generally designated as 1554. Some of the subsystems shown in FIG. 15 perform communication-related functions, whereas other subsystems may provide "resident" or on-device functions. Notably, some subsystems, such as the keyboard 1546 and the display 1538, for example, may be used for both communication-related functions, such as entering a text message for transmission over a communication network, and device-resident functions such as a calculator or task list.

Operating system software used by the microprocessor 1534 is preferably stored in a persistent store such as the flash memory 1538, which may instead be a read-only memory ("ROM") or similar storage element (not shown). Those skilled in the art will appreciate that the operating system, specific device applications, or parts thereof, may be temporarily loaded into a volatile memory such as the RAM 1540. Received communication signals may also be stored in the RAM 1540.

As shown in FIG. 15, the flash memory 1536 can be segregated into different areas for both computer programs 1556 and program data storage such as device state 1558, an address book 1560, personal information manager ("PIM") 1562, and other programs 1564. These different storage types indicate that each program can allocate a portion of the flash memory 1536 for their own data storage requirements. The microprocessor 1534, in addition to its operating system functions, preferably enables execution of software applications on the host mobile station 1502. A predetermined set of applications that control basic operations, including at least data and voice communication applications for example, will normally be installed on the host mobile station 1502 during manufacturing. A preferred software application may be a PIM application having the ability to organize and manage data items relating to the user of the host mobile station 1502 such as, but not limited to, e-mail, calendar events, voice mails, appointments, and task items. Naturally, one or more memory stores would be available on the host mobile station 1502 to facilitate storage of PIM data items. Such PIM application would preferably have the ability to send and receive data items, via the communication network 1504. In a preferred embodiment, the PIM data items are seamlessly integrated, synchronized and updated, via the communication network 1504, with the host mobile station user's corresponding data items stored or associated with a host computer system. Additional applications may also be loaded onto the host mobile station 1502 through the communication network 1504, the auxiliary I/O subsystem 1543, the serial port 1544, other communications subsystem 1552 or any other compatible device subsystem 1554, and be installed by the user in the RAM 1540 or preferably a non-volatile store (not shown) for execution by the microprocessor 1534. Such flexibility in application installation increases the functionality of the host mobile station 1502 and may provide enhanced on-device functions, communication-related functions, or both. For example, secure communication applications may enable electronic commerce functions and other such financial transactions to be performed using the host mobile station 1502.

In a data communication mode, a received signal such as a text message or web page download will be processed by the communication subsystem 1506 and input to the microprocessor 1534, which preferably further processes the received signal for output to the display 1538, or alternatively to the auxiliary I/O subsystems 1542. The user of the host mobile station 1502 may also compose data items such as e-mail messages for example, using the keyboard 1546, which is preferably a complete alphanumeric keyboard or telephone-type keypad, in conjunction with the display 1538 and possibly with the auxiliary I/O subsystems 1542. Such composed items may then be transmitted over the communication network 1504 through the communication subsystem 1506.

For voice communications, overall operation of the host mobile station 1502 is similar, except that the received signals would preferably be output to the speaker 1548 and signals for transmission would be generated by the microphone 1550. Alternative voice or audio I/O subsystems, such as a voice message recording subsystem, may also be implemented on the host mobile station 1502. Although voice or audio signal output is preferably accomplished primarily through the speaker 1548, the display 1538 may also be used to provide an indication of the identity of a calling party, the duration of a voice call, or other voice call related information for example.

The serial port 1544, such as Universal Serial Bus ("USB"), in FIG. 15 would normally be implemented in a personal digital assistant ("PDA")-type host mobile station for which synchronization with a user's desktop computer (not shown) may be desirable, but is an optional device component. The serial port 1544 would enable the user to set preferences through an external device or software application and would extend the capabilities of the host mobile station 1502 by providing for information or software downloads to host mobile station 1502 other than through a wireless communication network. An alternate download path may for example be used to load an encryption key onto the device through a direct and thus reliable and trusted connection to thereby enable secure device communication. Other communications subsystems 1552, such as a short-range communications subsystem, is a further optional component which may provide for communication between the host mobile station 1502 and different systems or devices, which need not necessarily be similar devices. For example, the other communications subsystem 1552 may include an infrared device and associated circuits and components or a Bluetooth™ communication module to provide for communication with similarly enabled systems and devices.

A mobile communications device, such as a cellular telephone, is typically formed of software, firmware, and hardware adapted to provide communications services over a compatible wireless communications network. This process of forming the relationship between the mobile communications device and the service is known in the art as provisioning. Typically, a network operator provisions the mobile communications device via a subscription to a service contract. Thus, once the mobile communications device has been provisioned, the user of the mobile communications device is often referred to as a subscriber. In a voice and data network such as GSM, GPRS, CDMA, or various other third generation networks such as EDGE or UMTS, both voice and data services may be available to mobile communications devices. Such voice services include voice calling and SMS, and such data services include Internet browsing, email, and MMS.

Although many services may be available on a given network, only those subscribers who use mobile communications devices that have been provisioned for those services will be able to benefit from them. This limitation may present problems for both the subscriber and the network operator. On one hand, the subscriber may desire an existing service he does not have, i.e. an upgrade, or desire disabling a service, i.e. a downgrade. On the other hand the operator may want to offer a new service, but may hesitate if subscribers cannot benefit from them. One known solution is to provide an out of band communications link, such as a Universal Serial Bus ("USB"), on the mobile communications device, and enable the subscriber to load new software onto the mobile communications device via the out of band communication link using a personal computer, thus re-provisioning the mobile communications device. This solution may be an unacceptable solution to both the subscriber and the operator as there is a significant risk that the mobile communications device, by error, receives a wrong or incomplete load, and may require servicing. Furthermore, this solution may be unacceptable to the subscriber who does not have access to a personal computer. However, because the host mobile station 1502 is a host communications device that hosts the data communications client 104, the data communications client 104 may be provisioned directly by the user of host mobile station 1502.

Figure 16:
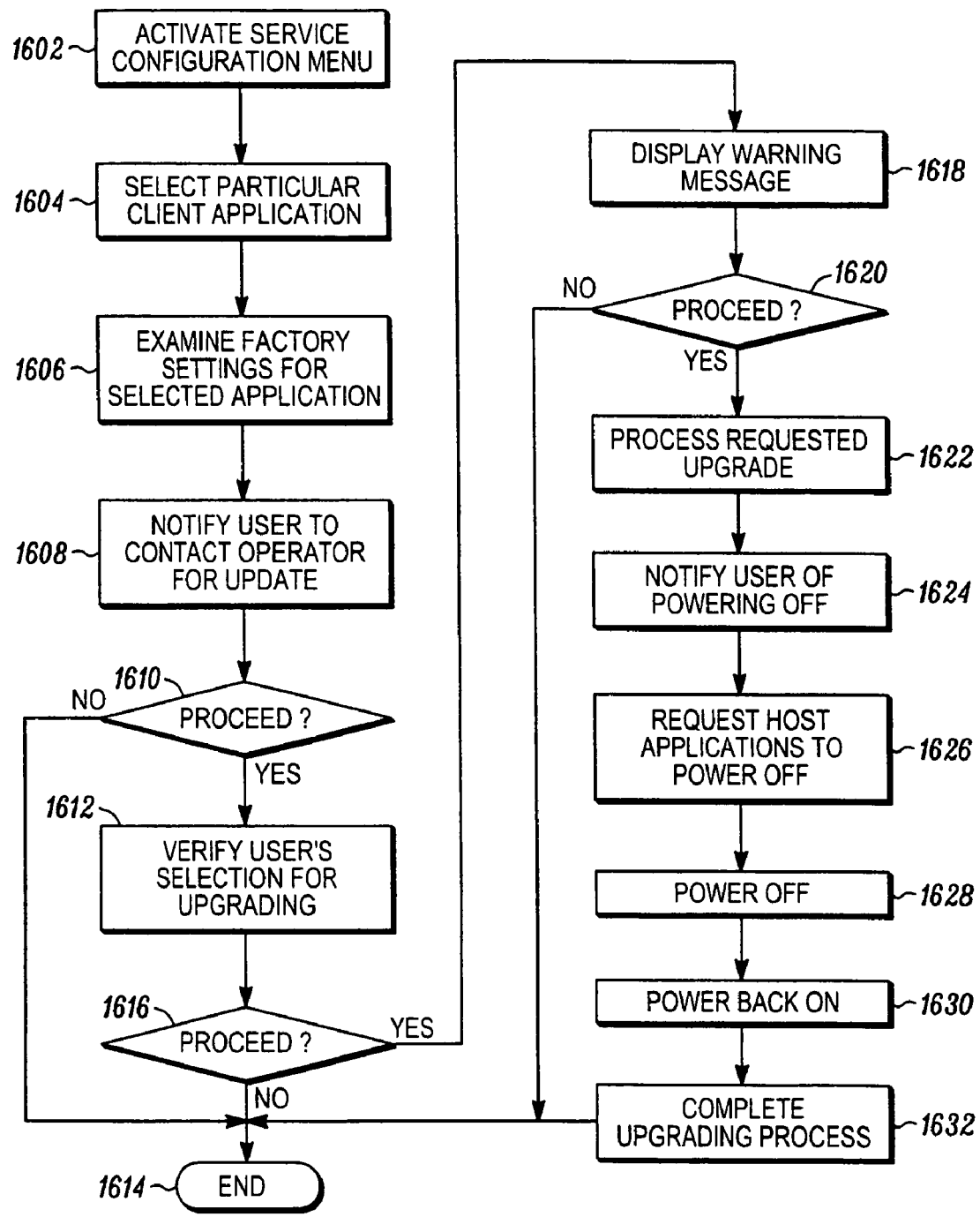
FIG. 16 is an exemplary flowchart illustrating a client service upgrade process of the host mobile station by provisioning the data communications client in accordance with at least one of the preferred embodiments.

FIG. 16 is an exemplary flowchart 1600 illustrating a client service upgrading process of the host mobile station 1502 by provisioning the data communications client 104 in accordance with at least one of the preferred embodiments. Before the client service upgrading process is initiated, certain prerequisites, or preconditions, of the host mobile station 1502 may need to be met, such as, but not limited to, identifying the current service type as base, i.e. having no upgraded service, being configured to allow service change, having no service lock, and having no service change. The client service upgrading process begins in block 1602 as the user activates a service configuration menu item indicative of modifying the data communications client 104, which includes the client applications 106. The user then selects a new client application from the client applications 106 available in the host mobile station 1502 in block 1604. The user may select the new client application by selecting from available applications display in the current client desktop. The data communications client 104 examines factory setting for the selected new client application in block 1606. In block 1608, the data communications client 104 notifies the user that the operator must be contacted, for example, by displaying a message "This solution requires you to contact your operator and request that your wireless service to be updated to support this feature." If the user indicates that he desires to proceed in block 1610, then the data communications client 104 displays a verification message in block 1612 indicative of the user's selection for upgrading. Otherwise the process is terminated in block 1614. After the verification message is displayed in block 1612 and if the user selects to proceed in block 1616, then the data communications client 104 displays a warning message notifying the user that the some data will be lost in block 1618, and allows the user to terminate the process to backup the data in block 1620. If the user selects to proceed in block 1620 after the warning message, then the data communications client 104 processes the user's request for upgrading the selected new client application in block 1622. If the user selects to terminate the process in block 1620, then the process is terminated in block 1614. The data communications client 104 then informs the user that the host mobile station 1502 will be turned off in block 1624, and requests the host applications 142 to power off the host mobile station 1502 in block 1626. The host mobile station 1502 is then powered off in block 1628. After the host mobile station 1502 is powered back on in block 1630, the upgrading process is completed in block 1632 and the upgrading process is terminated in 1614. After the client service upgrading process is completed, certain post-conditions of the host mobile station 1502 may be set, such as, but not limited to, recording the provisioning as complete, setting the current service type as upgraded, having no service lock, and having no service change.

Figure 17:
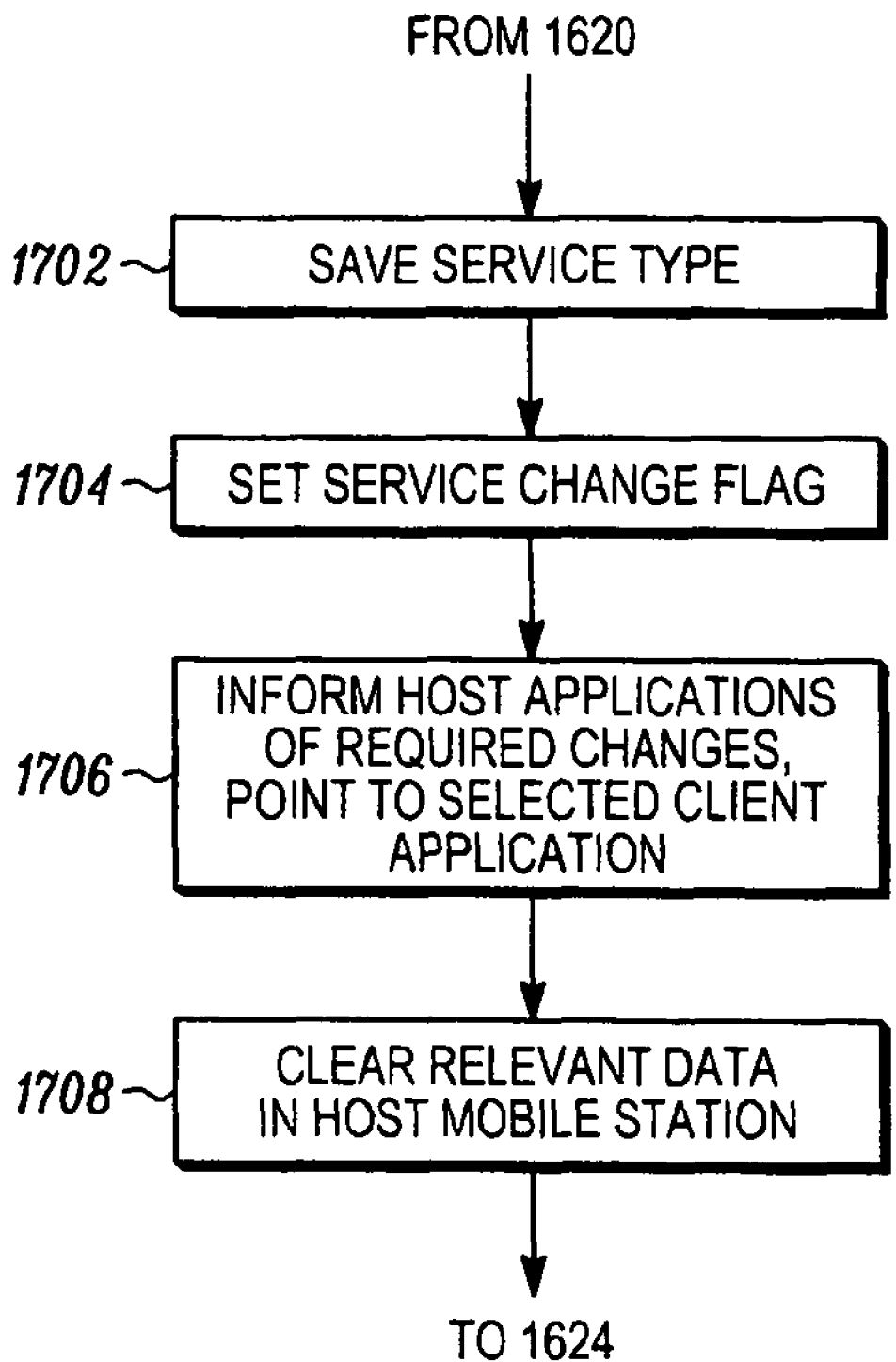
FIG. 17 is an exemplary flowchart further illustrating the processing of the user's request for upgrading the selected client application in accordance with at least one of the preferred embodiments.

FIG. 17 is an exemplary flowchart further illustrating block 1622 of processing the user's request for upgrading the selected client application in accordance with at least one of the preferred embodiments. The data communications client 104 in block 1702 saves the service type for the selected new client application, and sets a service change flag in block 1704. The data communications client 104 then informs the host applications 142 of required changes and points to the selected client application in block 1706, and clears the relevant data in the host mobile station 1502 associated with the selected client application in block 1708.

Figure 18:
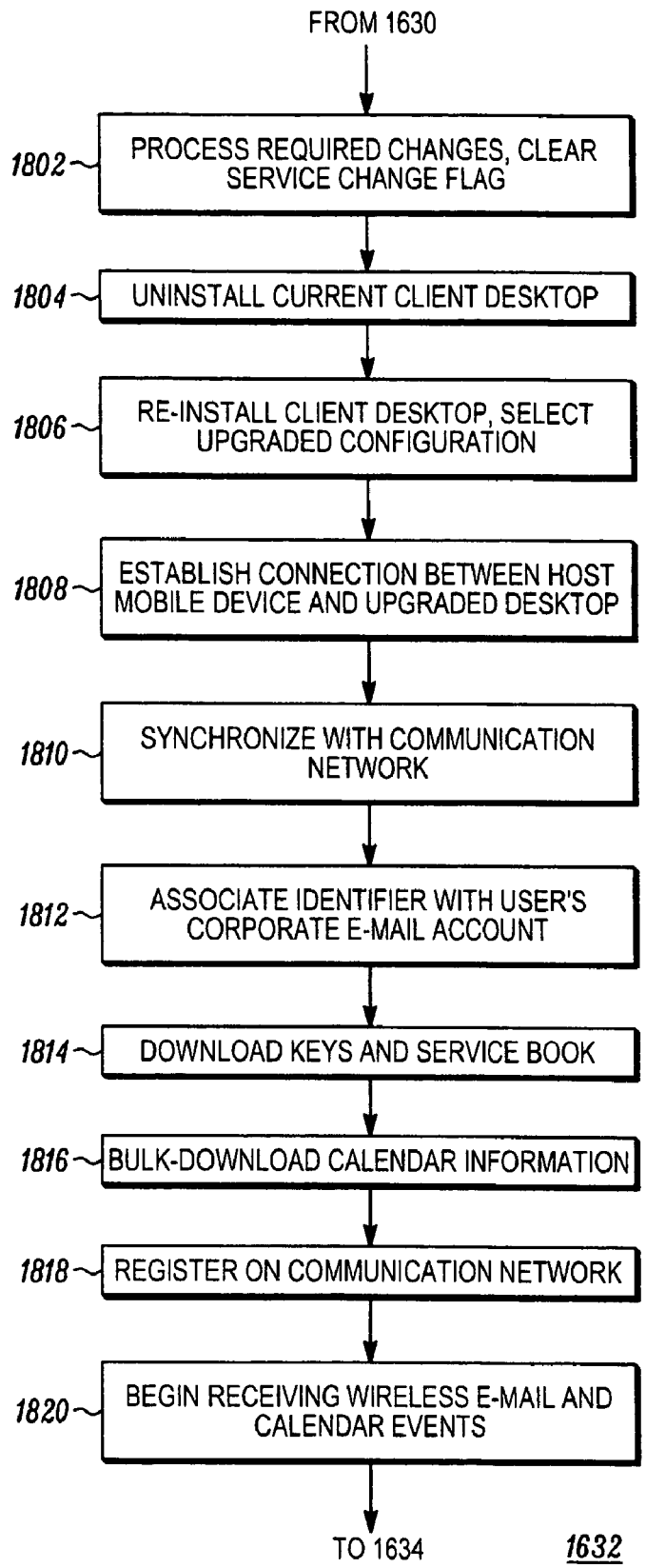
FIG. 18 is an exemplary flowchart further illustrating the completion of the upgrading process after the host mobile station is powered back on using the e-mail application, which includes scheduling ability such as a calendar, as the selected client application to be upgraded.

FIG. 18 is an exemplary flowchart further illustrating block 1632 of completing the upgrading process after the host mobile station 1502 is powered back on in block 1630 using the e-mail application, which includes scheduling ability such as a calendar, as the selected client application to be upgraded. In block 1802, the host applications 142 processes the required changes provided in block 1706 and clears the service change flag. The user then uninstalls the current client desktop to remove the base configuration of the client desktop in block 1804, and re-installs the client desktop and selects the upgraded configuration in block 1806. The connection between the host mobile station 1502 and the upgraded client desktop is established in block 1808, and the upgraded client desktop synchronizes with the communication network 1504 including associated data servers in block 1810. The upgraded client desktop then associates an identifier with the user's corporate e-mail account in block 1812, and downloads keys and service books in block 1814. The upgraded client desktop performs bulk download of calendar information in block 1816, and the data communications client 104 registers on the communication network 1504 in block 1818. The user then starts receiving wireless e-mail and calendar events in block 1820.

Figure 19:
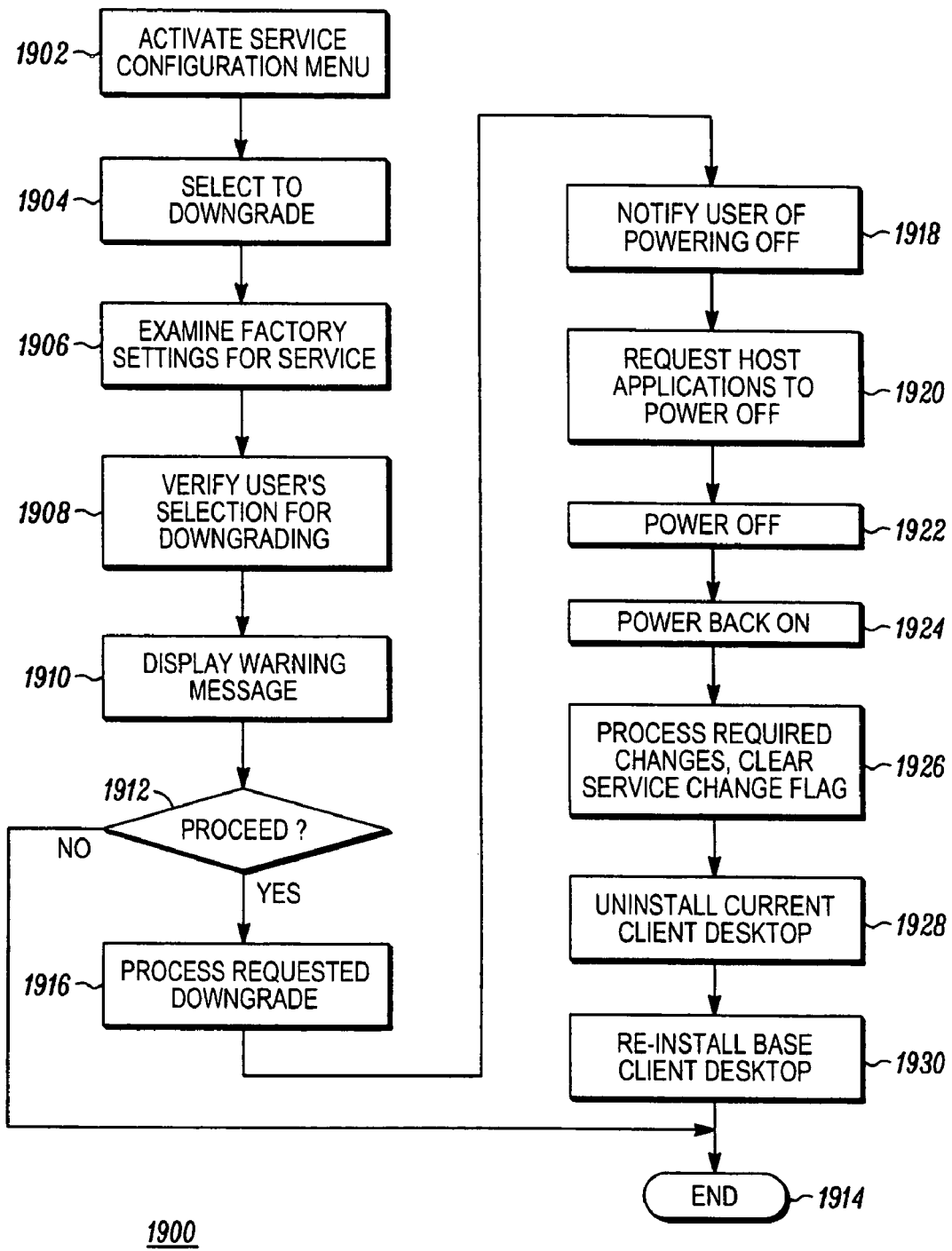
FIG. 19 is an exemplary flowchart illustrating a client service downgrade process of the host mobile station by provisioning the data communications client in accordance with at least one of the preferred embodiments.

FIG. 19 is an exemplary flowchart 1900 illustrating a client service downgrade process of the host mobile station 1502 by provisioning the data communications client 104 in accordance with at least one of the preferred embodiments. Before the client service downgrade process is initiated, certain prerequisites, or preconditions, of the host mobile station 1502 may need to be met, such as, but not limited to, identifying the current service type as upgraded, i.e. having a upgraded service, being configured to allow service change, having no service lock, and having no service change. The client service downgrade process begins in block 1902 as the user activates a service configuration menu item indicative of modifying the data communications client 104, which includes the client applications 106. The user then selects to downgrade from the current service in block 1904, and the data communications client 104 examines the current factory settings for the service type in block 1906. The data communications client 104 displays a verification message in block 1908 indicative of the user's selection for downgrading. The data communications client 104 displays a warning message notifying the user that the data will be lost in block 1910, and allows the user an option to terminate the downgrading process in block 1912. If the user selects to terminate the downgrading process in block 1912, the downgrading process is terminated in block 1914. If the user selects to proceed in block 1912 after the warning message, then the data communications client 104 processes the user's request for downgrading the service in block 1916. The data communications client 104 then informs the user that the host mobile station 1502 will be turned off in block 1918, and requests the host applications 142 to power off the host mobile station 1502 in block 1920. The host mobile station 1502 is then powered off in block 1922, and is powered back on in block 1924. In block 1926, the host applications 142 processes the required changes and clears the service change flag. The user then uninstalls the current client desktop to remove the upgrade configuration of the client desktop in block 1928, and re-installs the base client desktop 1930. The downgrading process is then terminated in block 1914. After the client service downgrading process is completed, certain post-conditions of the host mobile station 1502 may be set, such as, but not limited to, recording the provisioning as complete, setting the current service type as base, having no service lock, and having no service change.

Figure 20:
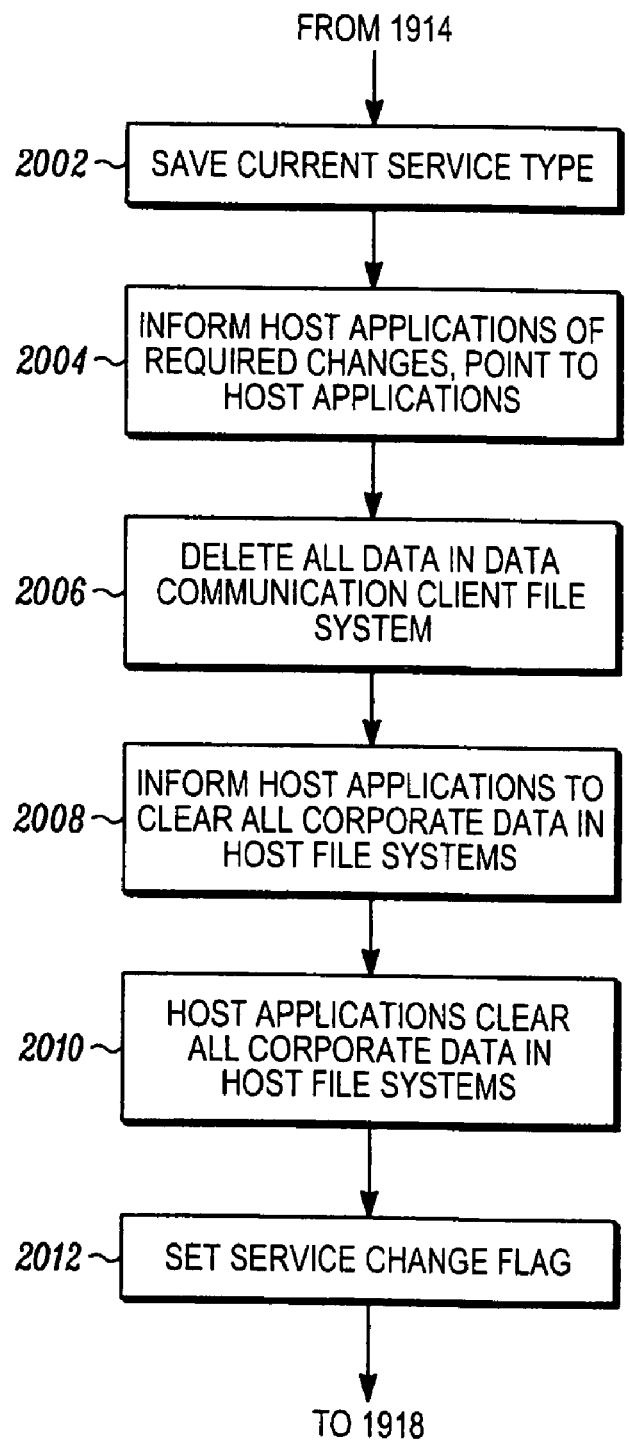
FIG. 20 is an exemplary flowchart further illustrating the process of the user's request for downgrading the service in accordance with at least one of the preferred embodiments.

FIG. 20 is an exemplary flowchart further illustrating block 1916 of processing the user's request for downgrading the service in accordance with at least one of the preferred embodiments. The data communications client 104 in block 2002 saves the current service, and informs the host applications 142 of required changes and points to the host applications 142 in block 2004. In block 2006, the data communications client 104 deletes of all data contained in the data communications client file system, and informs the host applications 142 to perform "KILL DEVICE" in accordance with information technology ("IT") policy to clear all corporate data in host file systems in block 2008. The host applications 142 then clears all corporate data in the host file systems in block 2010, and the data communications client 104 set the service change flag in block 2012.

The embodiments described herein are examples of structures, e systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

We claim:

1. A host wireless device comprising:

a processor for executing computer program code;

a memory connected to said processor for storing computer program, code;

an uncertified client stored in said memory of said host device and having a plurality of client applications, the uncertified client including a client operating system, and a client virtual machine configured to execute the plurality of client applications using the client operating system using said processor, the client operating system capable of sending client application commands and functions to directly invoke a host user interface of said host device;

at least one host application stored in said memory and coupled to the certified host device, the certified host device being certified for operation on a network by a certification body, the host application for execution in a host operating system to provide host dependent features, accessed through the host user interface on the certified host device;

an abstraction layer stored in said memory having a native interface for execution by said processor to communicate with said at least one host application, the abstraction layer configured to intercept said client application commands and functions from the client operating system and to translate said intercepted commands and functions to function calls through the native interface wherein the native interface invokes the at least one host application; and wherein the abstraction layer is further configured to accept a request from the at least one host application to activate a particular client application of the plurality of client applications and to translate the request into a feature call, and the client virtual machine is further configured to activate the particular client application based upon the feature call.

2. The integration system of claim 1, wherein the abstraction layer is further configured to inject an operating system event of the uncertified client into the client virtual machine to activate the particular client application.

3. A method in a certified host device having an uncertified client for accessing a certified host dependent feature from the uncertified client, the certified host device having a host application controlling the host dependent feature, the uncertified client being located on the certified host device, the method comprising:
 storing the uncertified client having a plurality of client applications in a memory of said host device;
 making a request for the host dependent feature from a client application of the client, the client application executing on a client operating system of the uncertified client located on said host mobile device, the client operating system executing on a processor of the host device and capable of sending client application commands and functions to directly invoke a host user interface of said host device and the certified host device being certified for operation on a network by a certification body;
 sending the request for the host dependent feature to an abstraction layer, the host dependent features, being provided by the host application executing in a host operating system accessed through the host user interface on the certified host device;
 translating the request for the host dependent feature into a translated request in the abstraction layer;
 forwarding the translated request through the native interface wherein the native interface invokes the host application controlling the host dependent feature; and
 wherein the abstraction layer is further configured to accept a request from the host application to activate a particular client application of the plurality of client applications and translate the request into a feature call.

4. A method in a certified host device having a host application executing on a host operating system, the host application to provide host dependent features, accessed through the host user interface on the certified host device and for running an uncertified client application of an uncertified client from the host application, the method comprising:
 storing the uncertified client having a plurality of client applications in a memory of said host device;
 making a request for the host dependent feature from a client application of the client, the client application executing on a client operating system of the uncertified client located on said host mobile device, the client operating system executing on a processor of the host device and capable of sending client application commands and functions to directly invoke a host user interface of said host device and the certified host device being certified for operation on a network by a certification body;
 selecting the uncertified client application from the host application, said selecting including creating a function call for running the client application on a client operating system of the uncertified client located on said certified host device, the certified host device being certified for operation on a network by a certification body;
 sending the function call to a client abstraction layer;
 translating the function call;
 activating the uncertified client application from a client virtual machine communicating with said client abstraction layer; and
 running the uncertified client application in the uncertified client using a user interface of the certified host device.

5. The method of claim 4, wherein selecting the client application from the host application includes:
 creating an activation message; and
 transmitting the activation message from the host application to the client virtual machine.

6. The method of claim 5, wherein transmitting the activation message from the host application to the client virtual machine includes:
 transferring the activation message to a client abstraction layer;
 translating the activation message in the client abstraction layer using a native interface; and
 transmitting the translated activation message to the client virtual machine.

7. The method of claim 4, wherein activating the client application from the client virtual machine includes:
 requesting access to the user interface on the host device from the client application to the host application.

8. An application executing system configured to run a plurality of uncertified client applications in an uncertified client loaded on a certified host device, the application executing system comprising:
 a processor for executing computer program code;
 a memory connected to said processor for storing computer program code and said uncertified client;
 the plurality of uncertified client applications executing in a client operating system, the client operating system capable of sending client application commands and functions to directly invoke a host user interface of said host device;
 a host application stored in said memory configured for execution by said processor to select a client application and to transmit a function call associated with the client application, the host application executing on a host operating system and providing host dependent features accessed through the host user interface on the certified host device and;
 a client abstraction layer stored in said memory and coupled to the host application, the client abstraction layer configured for execution by said processor to accept the function call and configured to intercept said client application commands and functions from the client operating system and to translate said intercepted commands and functions to function calls through the native interface wherein the native interface invokes the host application;
 a reverse native interface stored in said memory and coupled to the client abstraction layer, the reverse native interface configured for execution by said processor to translate the function call for the client; and
 a client virtual machine stored in said memory and coupled to the reverse native interface, the client virtual machine configured for execution by said processor to accept the translated function call and to run the client application using the client operating system of the uncertified client located on the memory of the certified host device, the certified host device being certified for operation on a network by a certification body.

9. The application executing system of claim 8, further comprising:
 a user interface coupled to the host application, wherein the host application is further configured to control the user interface and the client application is further configured to gain access to the user interface, using the host application.

* * * * *